(12) United States Patent
Parker et al.

(10) Patent No.: US 11,847,583 B2
(45) Date of Patent: *Dec. 19, 2023

(54) SYSTEMS AND METHODS FOR PROVIDING CONSUMER FACING POINT-OF-SALE INTERFACES

(71) Applicant: GROUPON, INC., Chicago, IL (US)

(72) Inventors: David Scott Parker, Mountain View, CA (US); Tim Loong Mun, Berkeley, CA (US); Raul Eduardo Acuna Carrasco, San Francisco, CA (US); Kavin Arasu, Sunnyvale, CA (US); Peter Hong, San Francisco, CA (US)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,717

(22) Filed: Jul. 25, 2022

(65) Prior Publication Data
US 2023/0013098 A1    Jan. 19, 2023

Related U.S. Application Data

(63) Continuation of application No. 16/133,835, filed on Sep. 18, 2018, now Pat. No. 11,429,944, which is a
(Continued)

(51) Int. Cl.
*G06Q 30/02* (2023.01)
*G06Q 20/20* (2012.01)
(Continued)

(52) U.S. Cl.
CPC ......... *G06Q 20/202* (2013.01); *G06Q 20/322* (2013.01); *G06Q 30/0238* (2013.01)

(58) Field of Classification Search
CPC ........... G06Q 30/0264; G06Q 30/0269; G06Q 30/0272; G06Q 50/01; H04L 67/306
See application file for complete search history.

(56) References Cited

U.S. PATENT DOCUMENTS 2,153,480 A    4/1939  Pierce
6,208,468 B1   3/2001  Togino et al.
(Continued)

FOREIGN PATENT DOCUMENTS

EP    1017030 A2    7/2000
EP    2909799 A1    8/2015
(Continued)

OTHER PUBLICATIONS

"How to Scan Barcode with iPhone and iPad" (published on YoutTube by iPhone, iPad and Android Tutorials from HowTech on Jun. 12, 2013) (Year: 2013).*
(Continued)

*Primary Examiner* — James M Detweiler
(74) *Attorney, Agent, or Firm* — Alston & Bird LLP

(57) ABSTRACT

Systems, apparatus, methods, and non-transitory media for providing point-of-sale functionality are discussed herein. Some embodiments may include a system including a merchant device and a consumer facing device. The merchant device may include a merchant display device configured to present interactive displays of a merchant facing interface configured to be used by merchants. The consumer facing device may be configured to present interactive displays of a consumer facing interface configured to be used by consumers. The point-of-sale system may be configured to facilitate financial transactions and other forms of consumer service. For example, merchant inputs provided via the merchant facing interface (e.g., entered menu items) may be shown on the consumer facing interface. In another example, consumer inputs provided via the consumer facing interface be sent to the merchant device and/or otherwise used by the merchant device to facilitate a financial transaction, among other things.

20 Claims, 14 Drawing Sheets

Related U.S. Application Data continuation of application No. 14/454,675, filed on Aug. 7, 2014, now Pat. No. 10,163,089, which is a continuation of application No. 14/040,331, filed on Sep. 27, 2013, now Pat. No. 9,928,493.

(51) Int. Cl.
*G06Q 20/32* (2012.01)
*G06Q 30/0238* (2023.01)

(56) References Cited

U.S. PATENT DOCUMENTS

| | | |
|---|---|---|
| 6,327,578 B1 | 12/2001 | Mark |
| 6,764,013 B2 | 7/2004 | Ben-Aissa |
| 6,812,851 B1 | 11/2004 | Dukach et al. |
| 6,873,974 B1 | 3/2005 | Schutzer |
| 7,177,847 B2 | 2/2007 | Atkinson et al. |
| 7,229,013 B2 | 6/2007 | Ben-Aissa |
| 7,609,821 B2 | 10/2009 | Delaney et al. |
| 7,774,231 B2 | 8/2010 | Pond et al. |
| 7,891,560 B2 | 2/2011 | Hammad |
| 7,934,986 B2 | 5/2011 | Kane et al. |
| 8,045,967 B2 | 10/2011 | Lovegreen et al. |
| 8,131,619 B1 | 3/2012 | Veselka |
| 8,224,700 B2 | 7/2012 | Silver |
| 8,229,853 B2 | 7/2012 | Dispensa et al. |
| 8,284,061 B1 | 10/2012 | Dione |
| 8,370,264 B1 | 2/2013 | Wei et al. |
| 9,117,231 B2 | 8/2015 | Rodgers et al. |
| 9,576,286 B1 | 2/2017 | Artman et al. |
| 2002/0017561 A1 | 2/2002 | Tomoike |
| 2002/0029342 A1 | 3/2002 | Keech |
| 2002/0072921 A1 | 6/2002 | Boland et al. |
| 2002/0073044 A1 | 6/2002 | Singhal |
| 2002/0077993 A1 | 6/2002 | Immonen et al. |
| 2002/0107610 A1 | 8/2002 | Kaehler et al. |
| 2002/0107791 A1 | 8/2002 | Nobrega et al. |
| 2002/0142753 A1 | 10/2002 | Pecen et al. |
| 2002/0151313 A1 | 10/2002 | Stead |
| 2002/0174023 A1 | 11/2002 | Grey et al. |
| 2003/0037113 A1 | 2/2003 | Petrovykh |
| 2003/0172036 A1 | 9/2003 | Feigenbaum |
| 2003/0208409 A1 | 11/2003 | Mault |
| 2004/0030601 A1 | 2/2004 | Pond et al. |
| 2004/0116074 A1 | 6/2004 | Fujii et al. |
| 2004/0143473 A1 | 7/2004 | Tivey et al. |
| 2005/0028082 A1 | 2/2005 | Topalov et al. |
| 2005/0043996 A1 | 2/2005 | Silver |
| 2005/0182680 A1 | 8/2005 | Jones et al. |
| 2005/0187873 A1 | 8/2005 | Labrou et al. |
| 2005/0256841 A1 | 11/2005 | Rawat et al. |
| 2005/0273345 A1 | 12/2005 | Castillejo Romero |
| 2006/0069763 A1 | 3/2006 | Kido |
| 2006/0085267 A1 | 4/2006 | Lovegreen et al. |
| 2006/0156060 A1 | 7/2006 | Forrer et al. |
| 2006/0178943 A1 | 8/2006 | Rollinson et al. |
| 2006/0218043 A1 | 9/2006 | Rosenzweig et al. |
| 2007/0012763 A1 | 1/2007 | Van et al. |
| 2007/0061209 A1 | 3/2007 | Jackson |
| 2007/0150371 A1 | 6/2007 | Gangji |
| 2007/0219923 A1 | 9/2007 | Shea et al. |
| 2007/0250355 A1 | 10/2007 | Leet et al. |
| 2007/0280269 A1 | 12/2007 | Rosenberg |
| 2007/0282739 A1 | 12/2007 | Thomsen |
| 2008/0010193 A1 | 1/2008 | Rackley et al. |
| 2008/0051122 A1 | 2/2008 | Fisher |
| 2008/0065374 A1 | 3/2008 | Mittal et al. |
| 2008/0065490 A1 | 3/2008 | Novick et al. |
| 2008/0097851 A1 | 4/2008 | Bemmel et al. |
| 2008/0143487 A1 | 6/2008 | Hulvey |
| 2008/0147546 A1 | 6/2008 | Weichselbaumer et al. |
| 2008/0162318 A1 | 7/2008 | Butler et al. |
| 2008/0182616 A1 | 7/2008 | Connors et al. |
| 2008/0208744 A1 | 8/2008 | Arthur et al. |
| 2008/0222004 A1 | 9/2008 | Pollock et al. |
| 2009/0024533 A1 | 1/2009 | Fernandes et al. |
| 2009/0030749 A1 | 1/2009 | Drummond et al. |
| 2009/0037286 A1 | 2/2009 | Foster |
| 2009/0063312 A1 | 3/2009 | Hurst |
| 2009/0070263 A1 | 3/2009 | Davis et al. |
| 2009/0076896 A1 | 3/2009 | Dewitt et al. |
| 2009/0167553 A1 | 7/2009 | Hong et al. |
| 2009/0192935 A1 | 7/2009 | Griffin et al. |
| 2009/0204881 A1 | 8/2009 | Murthy et al. |
| 2009/0271697 A1 | 10/2009 | Murrett |
| 2010/0082481 A1 | 4/2010 | Lin et al. |
| 2010/0094701 A1 | 4/2010 | Ghosh et al. |
| 2010/0145861 A1 | 6/2010 | Law et al. |
| 2010/0250549 A1 | 9/2010 | Muller et al. |
| 2010/0252624 A1 | 10/2010 | Van et al. |
| 2010/0276484 A1 | 11/2010 | Banerjee et al. |
| 2010/0320266 A1 | 12/2010 | White |
| 2010/0325047 A1 | 12/2010 | Carlson et al. |
| 2011/0029362 A1 | 2/2011 | Roeding et al. |
| 2011/0029370 A1 | 2/2011 | Roeding et al. |
| 2011/0055005 A1 | 3/2011 | Lang |
| 2011/0088087 A1 | 4/2011 | Kalbratt |
| 2011/0173096 A1 | 7/2011 | Bui |
| 2011/0191196 A1 | 8/2011 | Orr et al. |
| 2011/0218911 A1 | 9/2011 | Spodak |
| 2011/0238499 A1 | 9/2011 | Blackhurst et al. |
| 2011/0313867 A9 | 12/2011 | Silver |
| 2011/0320293 A1 | 12/2011 | Khan |
| 2012/0016745 A1 | 1/2012 | Hendrickson |
| 2012/0029990 A1 | 2/2012 | Fisher |
| 2012/0030066 A1 | 2/2012 | Stringfellow et al. |
| 2012/0036042 A1 | 2/2012 | Graylin et al. |
| 2012/0072311 A1 | 3/2012 | Khan |
| 2012/0088487 A1 | 4/2012 | Khan |
| 2012/0095852 A1 | 4/2012 | Bauer et al. |
| 2012/0136754 A1 | 5/2012 | Underwood |
| 2012/0150669 A1 | 6/2012 | Langley et al. |
| 2012/0158528 A1 | 6/2012 | Hsu et al. |
| 2012/0172062 A1 | 7/2012 | Altman et al. |
| 2012/0173350 A1 | 7/2012 | Robson |
| 2012/0173431 A1 | 7/2012 | Ritchie et al. |
| 2012/0179528 A1 | 7/2012 | Ortiz et al. |
| 2012/0209729 A1 | 8/2012 | Lovegreen |
| 2012/0209730 A1 | 8/2012 | Garrett |
| 2012/0226540 A1* | 9/2012 | Batalion ............... G06Q 30/06 705/14.23 |
| 2012/0233005 A1 | 9/2012 | White |
| 2012/0239417 A1 | 9/2012 | Pourfallah et al. |
| 2012/0239560 A1 | 9/2012 | Pourfallah et al. |
| 2012/0253913 A1 | 10/2012 | Richard |
| 2012/0254020 A1 | 10/2012 | Debow |
| 2012/0271697 A1 | 10/2012 | Gilman et al. |
| 2012/0271759 A1 | 10/2012 | Jong |
| 2012/0284131 A1* | 11/2012 | Soffer ............... G06Q 20/203 705/16 |
| 2012/0290449 A1 | 11/2012 | Mullen et al. |
| 2012/0310743 A1 | 12/2012 | Johri |
| 2012/0317628 A1 | 12/2012 | Yeager |
| 2012/0323664 A1* | 12/2012 | Klems ................ G06Q 30/02 705/14.1 |
| 2012/0330769 A1 | 12/2012 | Arceo |
| 2013/0024364 A1 | 1/2013 | Shrivastava et al. |
| 2013/0036048 A1 | 2/2013 | Campos et al. |
| 2013/0046634 A1 | 2/2013 | Grigg et al. |
| 2013/0073365 A1 | 3/2013 | McCarthy |
| 2013/0097031 A1 | 4/2013 | Royyuru et al. |
| 2013/0138518 A1 | 5/2013 | White et al. |
| 2013/0144701 A1 | 6/2013 | Kulasooriya et al. |
| 2013/0144731 A1 | 6/2013 | Baldwin et al. |
| 2013/0151357 A1* | 6/2013 | Havas ................. G06Q 50/12 705/15 |
| 2013/0159080 A1 | 6/2013 | Wu et al. |
| 2013/0159119 A1 | 6/2013 | Henderson et al. |
| 2013/0159181 A1 | 6/2013 | Hueck |
| 2013/0173475 A1 | 7/2013 | Lund |
| 2013/0185208 A1 | 7/2013 | Aaron et al. |
| 2013/0191174 A1 | 7/2013 | Zhou et al. |
| 2013/0191227 A1 | 7/2013 | Pasa et al. |
| 2013/0282438 A1 | 10/2013 | Hunter et al. |

(56) References Cited

U.S. PATENT DOCUMENTS

| | | | |
|---|---|---|---|
| 2013/0304642 | A1 | 11/2013 | Campos |
| 2013/0317928 | A1 | 11/2013 | Laracey |
| 2013/0339233 | A1 | 12/2013 | Lee et al. |
| 2013/0346302 | A1 | 12/2013 | Purves et al. |
| 2014/0006182 | A1 | 1/2014 | Wilson |
| 2014/0006205 | A1 | 1/2014 | Berry et al. |
| 2014/0032297 | A1 | 1/2014 | Germann et al. |
| 2014/0058862 | A1 | 2/2014 | Celkonas |
| 2014/0058938 | A1 | 2/2014 | McClung, III |
| 2014/0067677 | A1* | 3/2014 | Ali .................... G06Q 20/40 705/44 |
| 2014/0074655 | A1 | 3/2014 | Lim et al. |
| 2014/0099981 | A1 | 4/2014 | Horbal |
| 2014/0100930 | A1* | 4/2014 | Lopez ................ G06Q 30/0222 705/14.23 |
| 2014/0100973 | A1 | 4/2014 | Brown et al. |
| 2014/0108108 | A1 | 4/2014 | Artman et al. |
| 2014/0108247 | A1 | 4/2014 | Artman et al. |
| 2014/0114776 | A1 | 4/2014 | Solanki et al. |
| 2014/0143018 | A1 | 5/2014 | Nies et al. |
| 2014/0229375 | A1 | 8/2014 | Zaytzsev et al. |
| 2014/0244354 | A1 | 8/2014 | Seifert |
| 2014/0304047 | A1 | 10/2014 | Maw et al. |
| 2014/0310117 | A1 | 10/2014 | Moshal |
| 2014/0324565 | A1* | 10/2014 | Ratnakar ............ G06Q 30/0236 705/14.35 |
| 2014/0344085 | A1* | 11/2014 | Ran .................... G06Q 20/42 705/21 |
| 2014/0344153 | A1 | 11/2014 | Raj et al. |
| 2015/0046276 | A1 | 2/2015 | Artman et al. |
| 2015/0095134 | A1 | 4/2015 | Parker et al. |
| 2015/0269557 | A1 | 9/2015 | Artman et al. |

FOREIGN PATENT DOCUMENTS

| | | |
|---|---|---|
| EP | 2954447 A1 | 12/2015 |
| EP | 2973322 A1 | 1/2016 |
| WO | 2011/112752 A1 | 9/2011 |
| WO | 2012/106757 A1 | 8/2012 |
| WO | 2013/066910 A1 | 5/2013 |
| WO | 2013/077767 A1 | 5/2013 |
| WO | 2014/062229 A1 | 4/2014 |
| WO | 2014/062230 A1 | 4/2014 |
| WO | 2014/124935 A1 | 8/2014 |
| WO | 2014/153352 A1 | 9/2014 |
| WO | 2014/164228 A1 | 10/2014 |
| WO | 2015/048476 A1 | 4/2015 |

OTHER PUBLICATIONS

"VeriFone_MX Series the Point of Sale is Now the Point of Engagement.wmv" (YouTube video at https://www.youtube.com/watch?v=oubX3mWo388 published on Jan. 16, 2013) (Year: 2013).*

"VeriFone_MX Series_The Point of Sale is Now the Point of Engagement.wmv" (published on YouTube on Jan. 16, 2013 at https://www.youtube.com/watch?v=oubX3mWo388).

PCT International Preliminary Report on Patentability for application PCT/US2013/033145 dated Apr. 21, 2015.

PCT International Preliminary Report on Patentability for application PCT/US2013/033169 dated Apr. 21, 2015.

PCT International Preliminary Report on Patentability for application PCT/US2013/062389 dated Mar. 31, 2015.

PCT International Preliminary Report on Patentability for application PCT/US2014/015630 dated Aug. 11, 2015.

PCT International Preliminary Report on Patentability for application PCT/US2014/021387 dated Sep. 15, 2015.

PCT International Preliminary Report on Patentability for application PCT/US2014/057762 dated Mar. 29, 2016.

PCT International Search Report and Written Opinion of the Intenational searching Authority for application PCT/US2013/062389 dated May 27, 2014.

PCT International search Report and Written Opinion of the International Searching Authority for application PCT/US2013/033145 dated Jun. 21, 2013.

PCT International search Report and Written Opinion of the International Searching Authority for application PCT/US2014/015630 dated Dec. 8, 2014.

PCT International search Report and Written Opinion of the International Searching Authority for application PCT/US2014/021387 dated Jul. 7, 2014.

PCT International search Report for application PCT/US2013/033169 dated Jun. 10, 2013.

PCT Written Opinion of the International Searching Authority for application PCT/US2013/033169 dated Jun. 10, 2013.

U.S. Patent Application filed on Jun. 2, 2016, U.S. Appl. No. 15/172,032.

U.S. Patent Application filed on Mar. 12, 2013, U.S. Appl. No. 13/797,264.

U.S. Provisional Application filed on Mar. 11, 2013, U.S. Appl. No. 13/794,529.

WIPO Application No. PCT/US2014/057762, PCT International Search Report and Written Opinion of the International Searching authority dated Dec. 29, 2014.

* cited by examiner

SYSTEMS AND METHODS FOR PROVIDING CONSUMER FACING POINT-OF-SALE INTERFACES

CROSS REFERENCE TO RELATED APPLICATIONS

This application is a continuation of U.S. patent application Ser. No. 16/133,835, filed Sep. 18, 2018, which is a continuation of U.S. patent application Ser. No. 14/454,675, filed Aug. 7, 2014, which is a continuation of U.S. patent application Ser. No. 14/040,331, filed Sep. 27, 2013, which are each incorporated herein by reference in their entireties.

FIELD

Embodiments of the invention relate, generally, to techniques for providing point-of-sale functionality for consumers.

BACKGROUND

Merchants provide products, services, or experiences to consumers at merchant shops using point-of-sale systems that facilitate financial transactions. The design of a point-of-sale system at a merchant shop can affect the type of functionality provided by the point-of-sale system, the quality and speed of consumer service, and other aspects of a consumer's overall experience at the merchant shop. In this regard, areas for improving current systems have been identified.

BRIEF SUMMARY

Through applied effort, ingenuity, and innovation, solutions to improve such systems have been realized and are described herein. Some embodiments may provide for a point-of-sale system configured to provide a linked merchant facing interface and consumer facing interface. The system may include a consumer facing device and a merchant facing device. The consumer facing device may include a consumer facing display device and the merchant facing device may include a merchant facing display device. The consumer facing device may further include processing circuitry configured to: provide a consumer facing interface to the consumer facing display device; receive consumer inputs provided via the consumer facing interface; and send the consumer inputs to a merchant device. The merchant facing device may further include processing circuitry configured to: provide a merchant facing interface to the merchant facing display device; receive the consumer inputs from the consumer facing device provided via the consumer facing interface; and facilitate a financial transaction based on at least one consumer input received from the consumer facing device.

In some embodiments, the processing circuitry of the merchant device may be further configured to generate the merchant facing interface and the consumer facing interface. In some embodiments, the processing circuitry of the merchant device may be configured to generate the merchant facing interface and the processing circuitry of the consumer facing device may be configured to generate the consumer facing circuitry. In some embodiments, a central system or server may be configured to generate the merchant facing interface and/or the consumer facing interface.

In some embodiments, processing circuitry of the merchant device may be further configured to provide the consumer facing interface and receive the consumer inputs from the consumer facing device via a wireless personal area network (PAN) connection.

In some embodiments, the processing circuitry of the merchant device may be further configured to: receive merchant inputs provided via the merchant facing interface; determine point-of-sale data based on at least one merchant input; and provide an indication of the point-of-sale data to the consumer facing interface of the consumer facing display device. In some embodiments, the point-of-sale data may indicate at least one of an item, a promotion, a menu item, an item price, a modification, and a total transaction price associated with a point-of-sale order.

In some embodiments, the consumer facing device may include a promotion instrument reader configured to generate promotion redemption data indicating one or more promotions. The consumer facing interface may be configured to receive the promotion redemption data. The processing circuitry of the consumer facing device is configured to send the promotion redemption data to the merchant device. The processing circuitry of the merchant device configured to facilitate the financial transaction based on the at least one consumer input further includes the processing circuitry being configured to: receive the promotion redemption data; determine a total transaction cost based at least in part on the promotion redemption data; and provide an indication of the total transaction cost to the consumer facing interface of the consumer facing device.

In some embodiments, the processing circuitry of the merchant device configured to facilitate the financial transaction based on the at least one consumer input further may further include the processing circuitry being configured to: receive tip data provided via the consumer facing interface; determine a total transaction cost based at least in part on the tip data; and facilitate the financial transaction based on the total transaction cost.

In some embodiments, the consumer facing device may include a card reader configured to generate payment data of the consumer. The consumer facing interface may be configured to receive the payment data. The processing circuitry of the consumer facing device may be configured to send the payment data to the merchant device. The processing circuitry of the merchant device configured to facilitate the financial transaction based on the at least one consumer input further includes the processing circuitry being configured to: receive the payment data; facilitate the financial transaction based at least in part on the payment data; and provide a status confirmation for the financial transaction to the merchant facing interface and the consumer facing interface after facilitating the financial transaction.

In some embodiments, the processing circuitry of the merchant device may be further configured to: receive receipt selection data from the consumer facing device and provided via the consumer facing interface; and facilitate at least one of a printing and emailing of a receipt for the financial transaction based on the receipt selection data.

Some embodiments may provide for a machine-implemented method for facilitating a point-of-sale transaction. For example, the method may be performed by a merchant device and/or a central system or server. The method may include: generating, by one or more processing circuitry, a merchant facing interface and a consumer facing interface; providing the merchant facing interface to a merchant display device; providing the consumer facing interface to a consumer facing display device; receiving consumer inputs provided via the consumer facing interface; and facilitating a financial transaction based on at least one consumer input received via the consumer facing interface.

In some embodiments, the method may further include generating the merchant facing interface and the consumer facing interface by processing circuitry of a merchant device. In some embodiments, providing the consumer facing interface and receiving the consumer inputs includes providing the consumer facing interface and receiving the consumer inputs via a wireless personal area network (PAN) connection between the processing circuitry of the merchant device and the processing circuitry of a consumer facing device, where the consumer facing device includes the consumer facing display device.

In some embodiments, the method may further include: receiving merchant inputs provided via the merchant facing interface; determining point-of-sale data based on at least one merchant input; and providing an indication of the point-of-sale data to the consumer facing interface. In some embodiments, the point-of-sale data may indicate at least one of an item, a promotion, an item price, a modification, and a total transaction price associated with a point-of-sale order In some embodiments, the method may further include: receiving promotion redemption data indicating one or more promotions and generated based on at least one consumer input provided via the consumer facing interface; determining a total transaction cost based at least in part on the promotion redemption data; and providing an indication of the total transaction cost to the consumer facing interface.

In some embodiments, the method may further include: receiving tip data indicating a tip amount and generated based on at least one consumer input provided via the consumer facing interface; determining a total transaction cost based at least in part on the tip data; and facilitating the financial transaction based on the total transaction cost.

In some embodiments, the method may further include: receiving the payment data of the consumer based on at least one consumer input provided via the consumer facing interface; facilitating the financial transaction based at least in part on the payment data; and providing a status confirmation for the financial transaction to the merchant facing interface and the consumer facing interface after facilitating the financial transaction.

In some embodiments, the method may further include: receiving receipt selection data from the consumer facing device and provided via the consumer facing interface; and facilitating at least one of a printing and emailing of a receipt for the financial transaction based on the receipt selection data.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

The patent application file contains at least one drawing executed in color. Copies of this patent application with color drawing(s) will be provided by the Office upon request and payment of the necessary fee.

Figure 1:
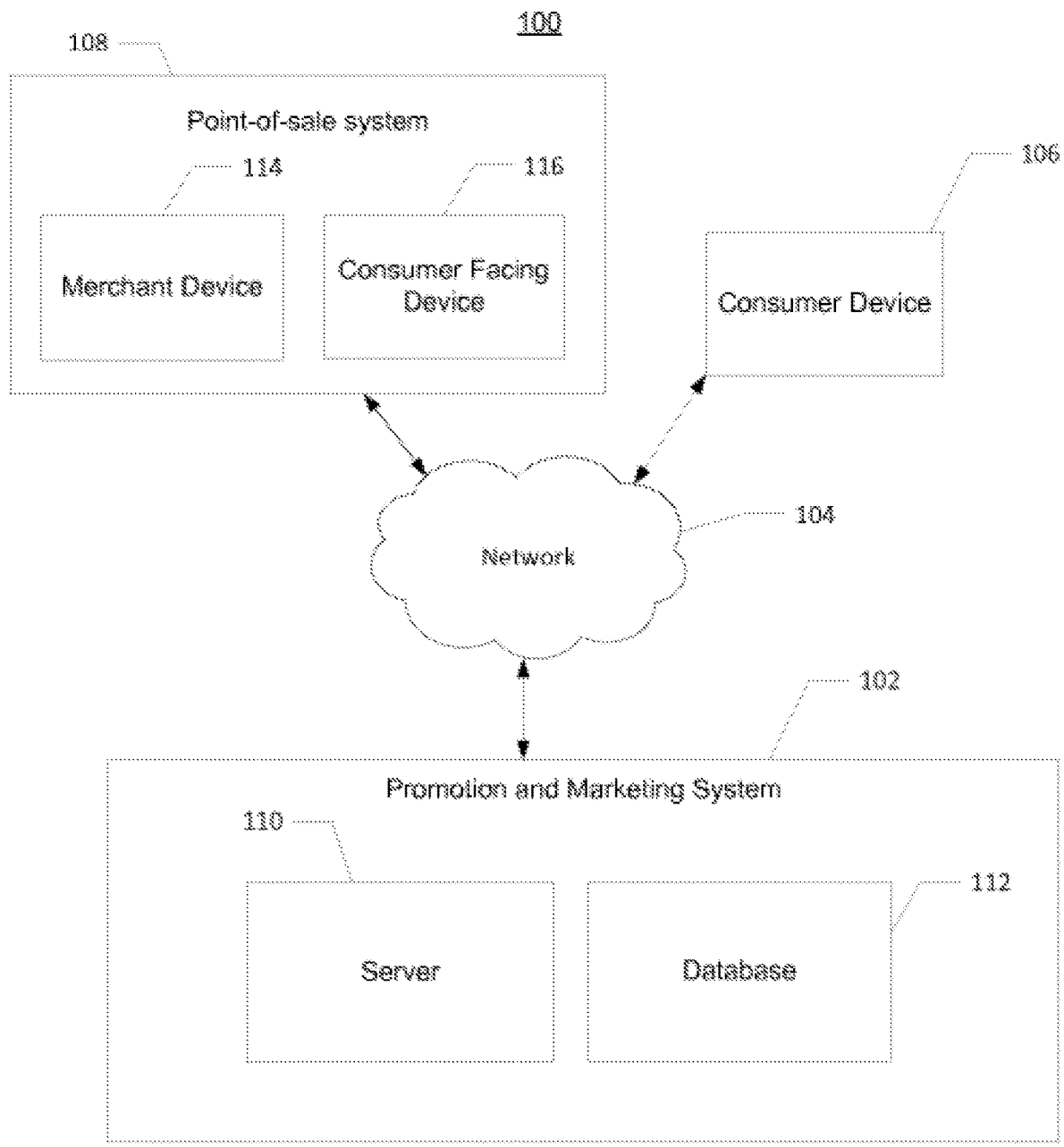
Figure 2:
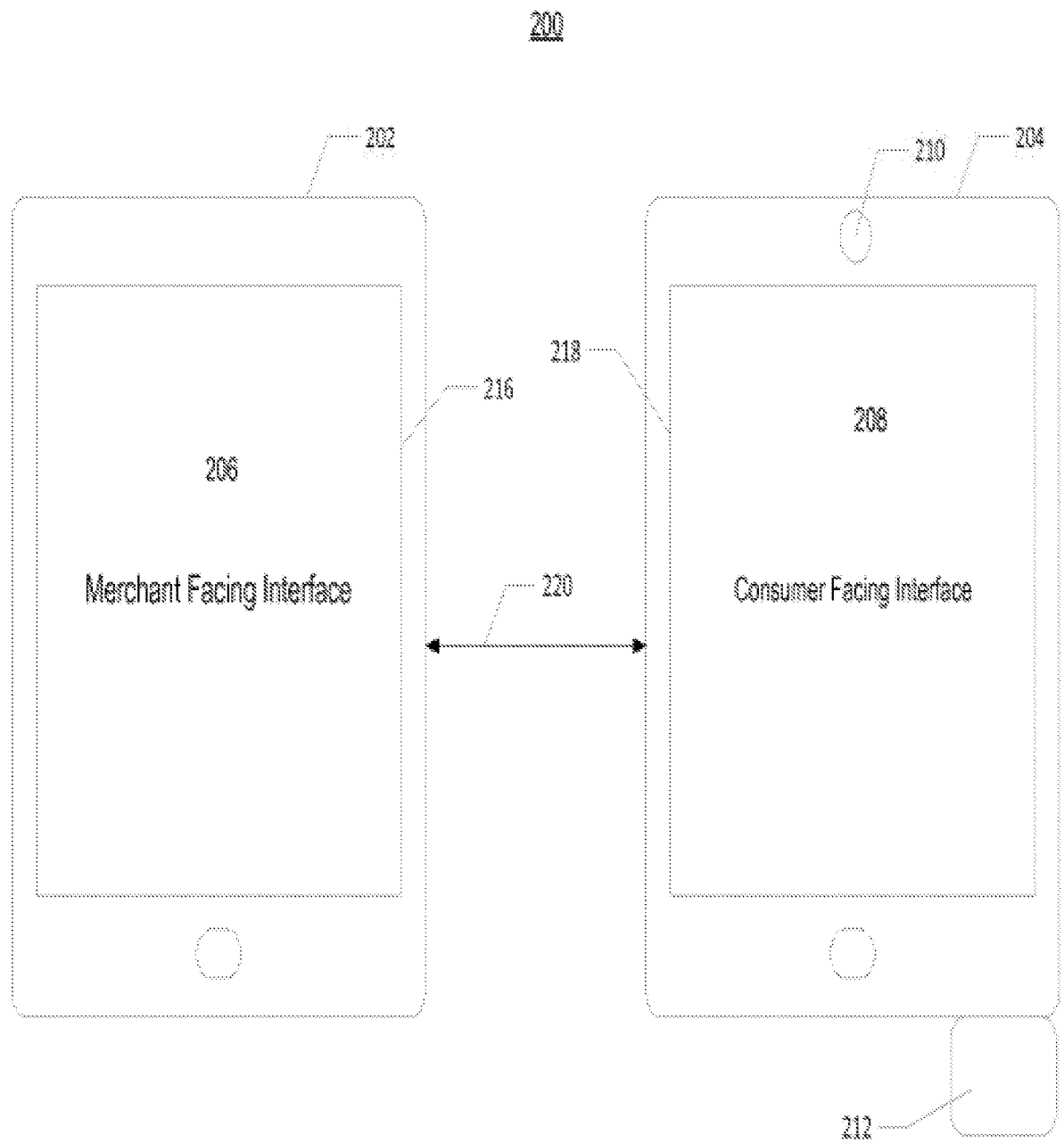
Figure 3:
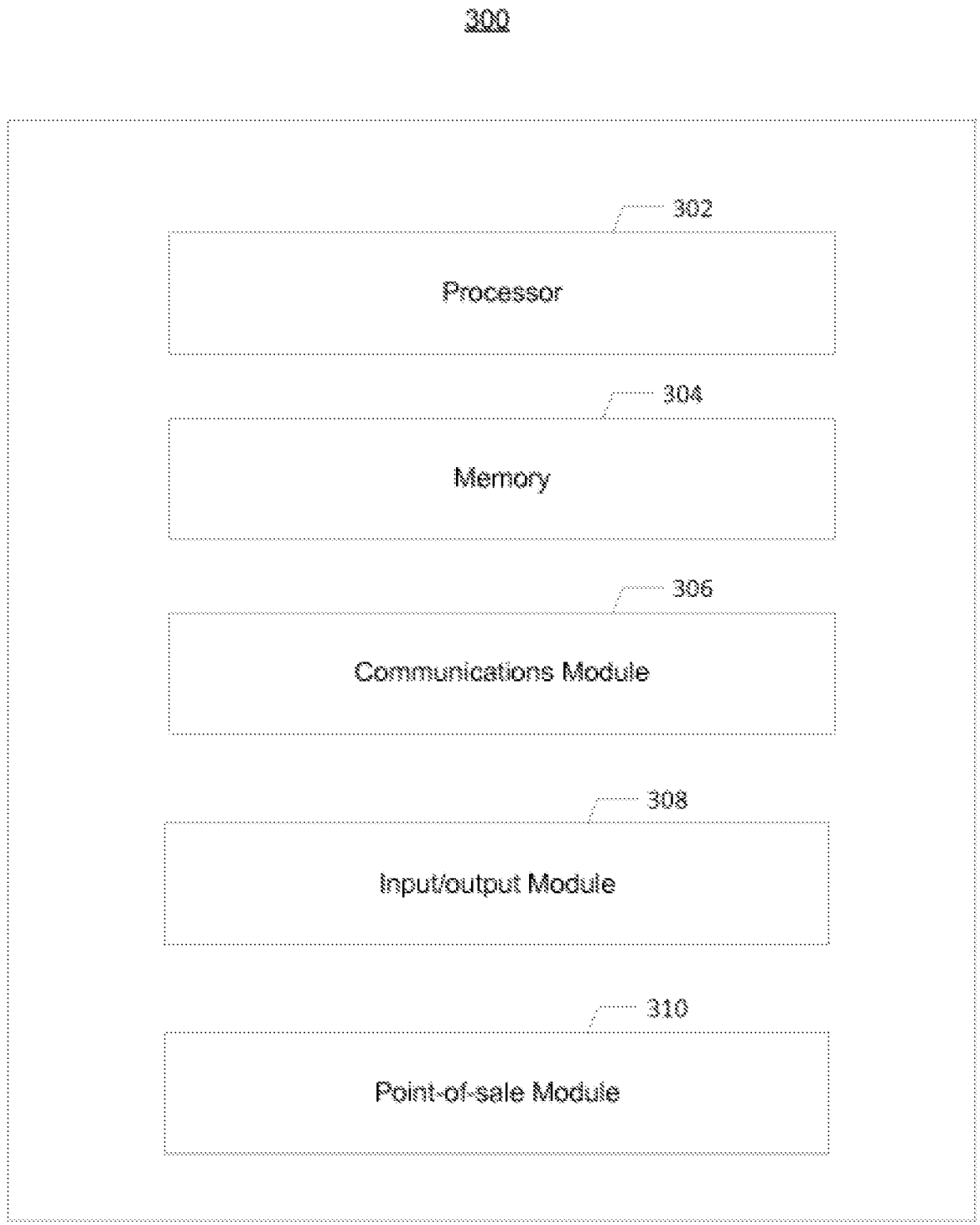
Figure 4:
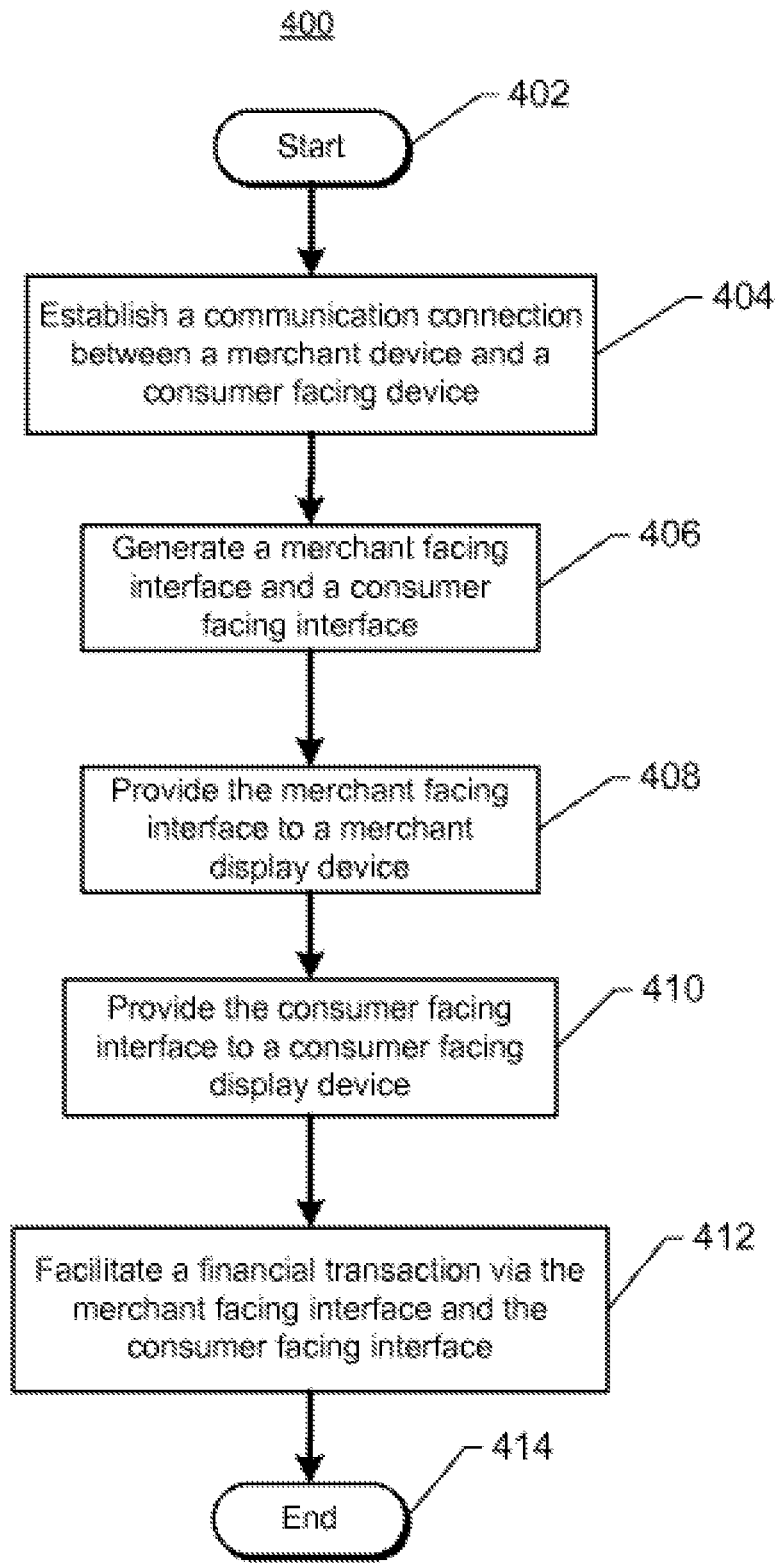
Figure 5:
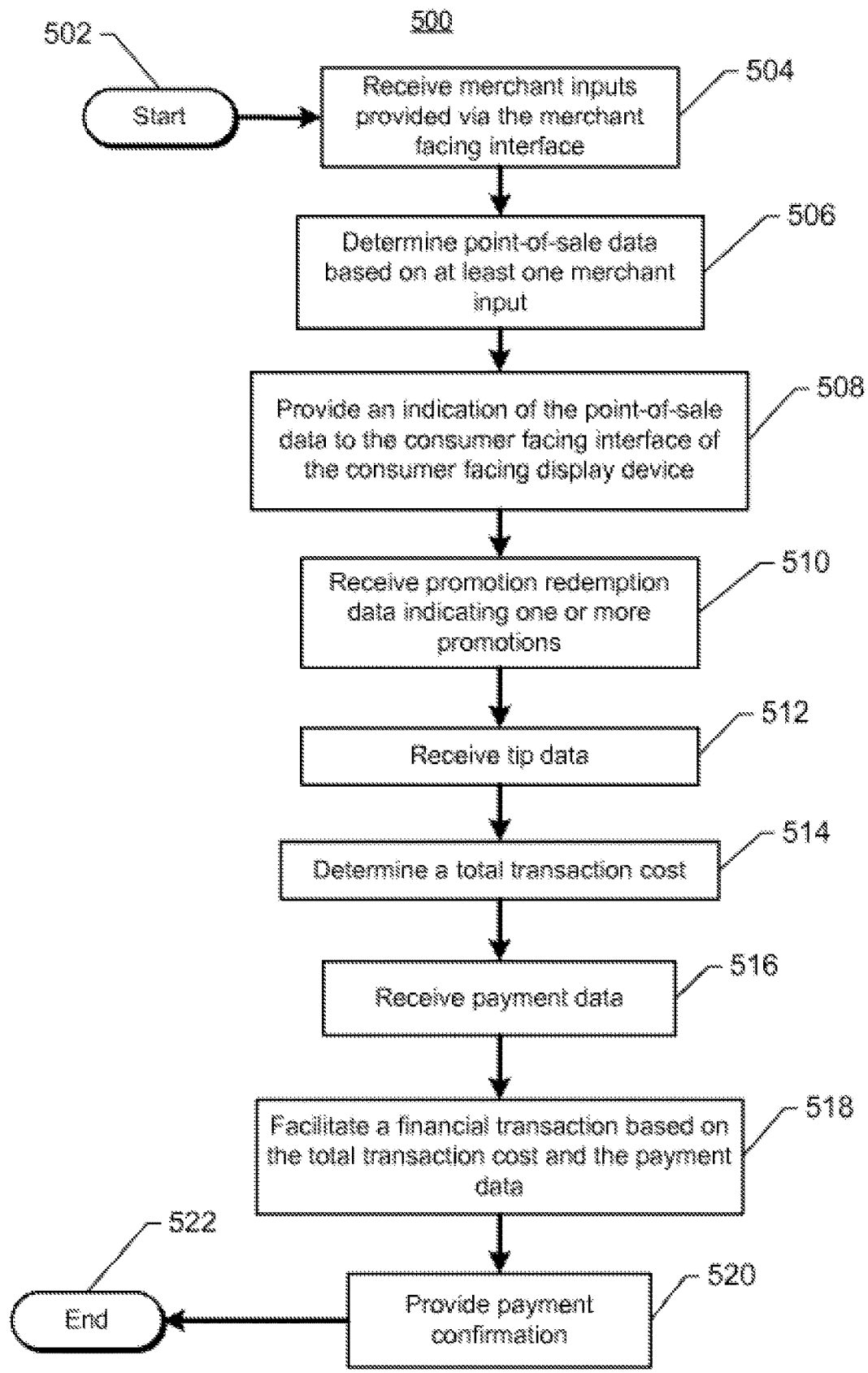

Having thus described some embodiments in general terms, reference will now be made to the accompanying drawings, which are not necessarily drawn to scale, and wherein:

FIG. 1 shows an example system, in accordance with some embodiments;

FIG. 2 shows an example point-of-sale system, in accordance with some embodiments;

FIG. 3 shows example circuitry, in accordance with some embodiments;

FIG. 4 shows an example of a method for providing a linked consumer facing interface and merchant facing interface, in accordance with some embodiments;

FIG. 5 shows an example of a method for facilitating a financial transaction, in accordance with some embodiments; and FIGS. 6-14 show example linked merchant facing and consumer facing interfaces, in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

Methods, systems, apparatus and computer program products described herein are operable for providing a linked merchant facing interface and consumer facing interface. A "merchant facing interface," as used herein, may refer to hardware, software, and/or combinations thereof configured to (e.g., via interactive merchant displays) facilitate merchant point-of-sale inputs. A "consumer facing interface," as used herein, may refer to second hardware, software, and/or combinations thereof configured to (e.g., via interactive consumer displays) facilitate consumer point-of-sale inputs. In that sense, the linked merchant and consumer interface may be configured to facilitate point-of-sale activity between consumers and merchants. For example, items for purchase entered by the merchant via the merchant facing interface can be displayed on the consumer facing interface. Here, consumers can view items, prices, and total transaction prices as the items are added in real time to a point-of-sale order. In another example, payment data, promotion redemption data, tip amounts, payment signatures, impressions associated with other available promotions, etc., may be provided by consumers via the consumer facing interface.

Some embodiments may provide for a point-of-sale system including a merchant device and a consumer facing device. For example, the consumer facing device may be a second device of the merchant that is configured to be provided for consumer use in the course of a point-of-sale transaction. In other examples, the consumer facing device may be a consumer device (e.g., a mobile phone of the consumer that is brought to the merchant location by the consumer).

The merchant device may include a "merchant facing display device," which as used herein, may refer to a display device configured to provide the various merchant facing displays of the merchant facing interface. In some embodiments, the merchant device may further include a touchscreen and/or other merchant input device (e.g., touchpad, keyboard, keypad, mouse, barcode scanner, RFID tag reader, etc.). For example, the merchant facing interface may include a point-of-sale interface in which menu items can be selected and added to point-of-sale orders via the touchscreen.

The consumer facing device may include a "consumer facing display device," which as used herein, may refer to a display device configured to provide the various consumer facing displays of the consumer facing interface. In some embodiments, the consumer facing device may further include a various point-of-sale input devices configured to facilitate point-of-sale functionality. For example, the consumer facing device may include a touchscreen and/or other consumer input device (e.g., keypad, touchpad, etc.) configured to generate tip data indicating a tip amount to be paid by the consumer, a pin number, a cashback amount, a consumer payment signature, etc. The consumer facing device may additionally or alternatively include a promotion instrument reader (e.g., a camera, barcode scanner, etc.) configured to generate promotion redemption data indicating a promotion being redeemed by the consumer and/or associated attributes of the promotion (e.g., from a promotional instrument such as a digital and/or print voucher/coupon). Here, for example, the promotion redemption data may indicate a discount that can be applied by the merchant device to the point-of-sale order. In some embodiments, the consumer facing device may include card reader (e.g., credit card, debit card, etc.) configured to generate payment data of the consumer. Here, the payment data may be used by the merchant device to facilitate a financial transaction.

In some embodiments, the merchant device and the consumer facing device may communicate with each other via a wireless personal area network (PAN) and/or using a Bluetooth protocol. Here, data generated by the merchant via the merchant interface (e.g., menu items being added to a point-of-sale order) may be sent via the wireless PAN to the consumer facing interface. In another example, data generated by the consumer via the consumer facing interface (e.g., the tip data, payment data, promotion redemption data, etc.) may be sent to the merchant device (e.g., to facilitate a financial transaction).

In some embodiments, the consumer facing interface may be a thin-client application running on the merchant device. For example, the merchant device may be configured to generate both the merchant facing interface and the consumer facing interface. The merchant device may be further configured to provide the consumer facing interface to the consumer facing device and receive consumer inputs from the consumer facing device, via the wireless PAN. In some embodiments, the consumer facing device may be a consumer device (e.g., a mobile device that is carried into a merchant shop by a consumer).

EXEMPLARY SYSTEM ARCHITECTURE

FIG. 1 shows an example system 100 in accordance with some embodiments. System 100 may include promotion and marketing system 102 (or "system 102"), network 104, consumer device 106, and point-of-sale system 108. Point-of-sale system 108 may include merchant device 114 and consumer facing device 116. In some embodiments, a point-of-sale system 108 may be deployed at a merchant shop and scaled in accordance with merchant need. For example, a point-of-sale system 108 may include multiple merchant devices 114 and/or consumer facing devices 116.

Although a single point-of-sale system 108 is shown, system 100 may include any number of point-of-sale systems that may be associated with various other merchants. A "merchant," as used herein, may include, but is not limited to, a provider of promotions, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce.

In some embodiments, merchant device 114 and consumer facing device 116 may be configured to provide point-of-sale (POS) functionality for the merchant, such as at the merchant's shop. The term "POS functionality" refers to activities associated with merchant or consumer transactions including, without limitation, retail sales transactions, secure payments via consumer device, inventory management transactions, customer/consumer relationship management, promotion redemption transactions, promotion provider transactions, rewards transactions, custom order transactions, returns and refunds, gratuities, employee management transactions (e.g., timecard transactions), and the like.

Merchant device 114 and/or consumer facing device 116 may each be a stationary (e.g., fixed PC or terminal that is not intended to move through a merchant location) and/or mobile device (e.g., a tablet, smartphone, laptop, or other similar device that is intended for or capable of moving about a merchant location).

Promotion and marketing system 102 may be communicably connected with point-of-sale system 108 and/or consumer device 106 via network 104. Promotion and marketing system 102 may be configured to provide a promotion and marketing service that is accessible via one or more consumer devices 106 and is operable to provide example promotion and/or marketing services on behalf of one or more merchants that are offering one or more instruments that are redeemable for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, promotion and marketing system 102 may be, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

Promotion and marketing system 102 may include server 110 and database 112. In some embodiments, the promotion and marketing system 102 may be configured to receive promotion data indicating a promotion for goods and/or services and/or one or more parameters of the promotion (e.g., target audience, timing, purchase value, promotional value, residual value, etc.) from a merchant device. Promotion and marketing system 102 may then generate and/or provide one or more impressions for the promotion to consumer device 106.

A "promotion," as used herein, may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion may include a $25 for $50 toward running shoes. In some examples, the promotion may define an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. In the running shoe promotion, for example, the accepted value may be $25 and the promotional value may be $50. In this example, the residual value may be equal to the accepted value.

An "instrument," as used herein, may include, but is not limited to, any type of gift card, tender, electronic certificate, medium of exchange, coupon, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. In some embodiments, an electronic instrument may be provided to consumer device 106 upon a consumer purchasing or otherwise accepting a promotion.

Server 110 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 114. In that sense, server 110 may include several servers performing interconnected and/or distributed functions. To avoid unnecessarily overcomplicating the disclosure, server 110 is shown and described herein as a single server.

Database 112 may be any suitable network storage device configured to store some or all of the information described herein. For example, database 112 may be configured to store item data and/or promotion data (e.g., attributes of an item and/or promotion), consumer data (e.g., attributes of the consumer such as profile information, preferences, purchase history, consumer behavior, among other things), and/or payment data (e.g., credit card information, debit card information, payment information, billing address, payment account information, among other things). As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer, such as a consumer with a consumer account provided by the promotion and marketing system 102. Although a single consumer device 106 is shown, system 100 may include any number of consumer devices that may be associated with various other consumers. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally or alternatively, consumer device 106 may be a stationary device such as a desktop computer, work station, point-of-sale device, or the like. In some embodiments, consumer facing device 116 may be a consumer device (e.g., consumer device 106) that is carried to the merchant location by a consumer.

FIG. 2 shows an example point-of-sale system 200, in accordance with some embodiments. Point-of-sale system 200 may include merchant device 202 and consumer facing device 204, shown here as two tablets. Merchant device 202 may be configured to provide merchant facing interface 206 via touchscreen/display 216. Consumer facing device 204 may be configured to provide the consumer facing interface 208 via touchscreen/display 218. As discussed above, in some embodiments, the merchant facing interface and consumer facing interface may be linked, such as via wireless PAN 220 and/or network 104, such that consumer inputs provided by consumers via the consumer facing interface (e.g., using touchscreen 218, camera 210, card reader 212) may be sent to the merchant device and merchant inputs provided by merchants via the merchant facing interface (e.g., using touchscreen 216) may be sent to the consumer facing device.

In some embodiments, consumer facing device 204 may include camera 210 and/or other promotion instrument reader (e.g., barcode scanner, radio frequency (RF) reader, near field communication (NFC) reader, etc.) configured to generate promotion redemption data. For example, a consumer may take a digital image of a promotion instrument (e.g., as displayed on a consumer device and/or a print coupon) that may include a barcode and/or other promotion identifier. In some embodiments, consumer facing device 204 may additionally or alternatively include card reader 212 configured to generate payment data. For example, the consumer may be allowed to swipe a credit card, debit card, etc. in embodiments where card reader 212 includes a barcode reader.

Some embodiments of point-of-sale systems including linked merchant and consumer facing interfaces may be different from point-of-sale system 200. For example, the merchant device may be separate from the merchant facing display (e.g., a monitor). In some embodiments, the card reader and/or promotion instrument reader may be separate from the consumer facing device. For example, merchant device may include the card reader and/or promotion instrument reader. In some embodiments, the consumer facing device may be stripped down to a consumer facing display device configured to provide various consumer facing interface displays and/or a touchscreen. In some embodiments, the merchant device and/or consumer facing device may be stationary devices and/or otherwise positioned in accordance with their function within a merchant shop. For example, the merchant device and/or merchant facing display may be positioned to face the merchant at a reservation desk, checkout line, order kiosk, or POS station, etc. while the consumer facing device and/or consumer facing display may be positioned to face the consumer. In one embodiment, the merchant device/merchant facing display and the consumer facing device/consumer facing display may be configured or positioned in a back-to-back orientation relative to one another.

In some embodiments, consumer facing devices may be positioned separately from the merchant facing device at locations of interest within a merchant shop. For example, a dine-in restaurant may place consumer facing devices at tables. Here, a merchant (e.g., a member of the wait staff) may carry a merchant device to the tables to take consumer orders. Consumers may view menus provided via the consumer facing interface and track the entries of the menu items as they are added to the point-of-sale order (e.g., by the merchant via the merchant device). Alternatively and/or additionally, consumers may be allowed to use the consumer facing interface to select menu items as a self-serve and/or add-to-order function. Here, menu items provided via the consumer facing interface and/or consumer facing device may be sent to the merchant device and treated accordingly (e.g., sent to a kitchen printer and/or display, added to the point-of-sale order, etc.) by the point-of-sale system. In some embodiments, upon completion of the meal, consumers may be allowed to provide payments via the consumer facing devices at the tables. Additional details regarding point-of-sale functionality leveraging linked merchant facing and consumer facing interfaces, applicable in some embodiments, are discussed in connection with methods 400 and 500 shown respectively in FIGS. 4-5.

In some embodiments, the merchant facing interface and/or consumer facing interface may be a thin-client application running on a central system (e.g., server 110 of promotion and marketing system 102). Here, the server 110 may be configured to generate both the merchant facing interface and the consumer facing interface, provide the merchant facing interface to the merchant device, and provide the consumer facing interface to the consumer facing device. Server 110 may be further configured to receive merchant inputs provided via the merchant facing interface and receive consumer inputs provided via the consumer facing interface. Relevant data may be determined based on the merchant and consumer input and may be provided to the merchant facing interface and/or consumer facing interface. Server 110 may be further configured to facilitate financial transactions based on the merchant and consumer inputs. In that sense, the linked merchant facing interface and consumer facing interface may be "linked" in various ways, such as via a direct connection between the merchant device and the consumer facing device (e.g., wired and/or wireless) and/or through server 110 (e.g., where the merchant device and consumer facing device may be thin-clients that communicate with each other via server 110.

FIG. 3 shows a schematic block diagram of example circuitry 300, some or all of which may be included in system 102, server 110, database 112, consumer device 106, point-of-sale system 108, merchant device 114, and/or consumer facing device 116. In accordance with some example embodiments, circuitry 300 may include various means, such as one or more processors 302, memories 304, communications modules 306, and/or input/output modules 308.

In some embodiments, such as when circuitry 300 is included in merchant device 114, point-of-sale module 310 may also or instead be included. As referred to herein, "module" includes hardware, software and/or firmware configured to perform one or more particular functions. In this regard, the means of circuitry 300 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 304) that is executable by a suitably configured processing device (e.g., processor 302), or some combination thereof.

Processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 3 as a single processor, in some embodiments, processor 302 may comprise a plurality of processing means. The plurality of processing means may be embodied on a single computing device or may be distributed across a plurality of computing devices collectively configured to function as circuitry 300. The plurality of processing means may be in operative communication with each other and may be collectively configured to perform one or more functionalities of circuitry 300 as described herein. In an example embodiment, processor 302 may be configured to execute instructions stored in memory 304 or otherwise accessible to processor 302. These instructions, when executed by processor 302, may cause circuitry 300 to perform one or more of the functionalities described herein.

Whether configured by hardware, firmware/software methods, or by a combination thereof, processor 302 may comprise an entity capable of performing operations according to embodiments of the present invention while configured accordingly. Thus, for example, when processor 302 is embodied as an ASIC, FPGA or the like, processor 302 may comprise specifically configured hardware for conducting one or more operations described herein. As another example, when processor 302 may be embodied as an executor of instructions, such as may be stored in memory 304, the instructions may specifically configure processor 302 to perform one or more algorithms, methods or operations described herein. For example, processor 302 may be configured to execute operating system applications, firmware applications, media playback applications, media editing applications, among other things.

Memory 304 may comprise, for example, volatile memory, non-volatile memory, or some combination thereof. Although illustrated in FIG. 3 as a single memory, memory 204 may comprise a plurality of memory components. The plurality of memory components may be embodied on a single computing component or distributed across a plurality of computing components. In various embodiments, memory 304 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 304 may be configured to store information, data, applications, instructions, or the like for enabling circuitry 300 to carry out various functions in accordance with example embodiments discussed herein. For example, in at least some embodiments, memory 304 may be configured to buffer input data for processing by processor 302. Additionally or alternatively, in at least some embodiments, memory 304 may be configured to store program instructions for execution by processor 302 and/or data for processing by processor 302. Memory 304 may store information in the form of static and/or dynamic information. This stored information may be stored and/or used by circuitry 300 during the course of performing its functionalities.

Communications module 306 may be embodied as any component or means embodied in circuitry, hardware, a computer program product comprising computer readable program instructions stored on a computer readable medium (e.g., memory 304) and executed by a processing device (e.g., processor 302), or a combination thereof that is configured to receive and/or transmit data from/to another device, such as, for example, a second circuitry 300 and/or the like. In some embodiments, communications module 306 (like other components discussed herein) can be at least partially embodied as or otherwise controlled by processor 302. In this regard, communications module 306 may be in communication with processor 302, such as via a bus. Communications module 306 may include, for example, an antenna, a transmitter, a receiver, a transceiver, network interface card and/or supporting hardware and/or firmware/software for enabling communications. Communications module 306 may be configured to receive and/or transmit any data that may be stored by memory 304 using any protocol that may be used for communications. Communications module 306 may additionally or alternatively be in communication with the memory 304, input/output module 308 and/or any other component of circuitry 300, such as via a bus. Communications module 306 may be configured to use one or more communications protocols such as, for example, Wi-Fi (e.g., a 802.11 protocol, etc.), Bluetooth, radio frequency systems (e.g., 900 MHz, 1.4 GHz, and 5.6 GHz communication systems), infrared, GSM, GSM plus EDGE, CDMA, quadband, and other cellular protocols, VOIP, or any other suitable protocol.

Input/output module 308 may be in communication with processor 302 to receive an indication of an input and/or to provide an audible, visual, mechanical, or other output. In that sense, input/output module 308 may include means for performing analog-to-digital and/or digital-to-analog data conversions. Input/output module 308 may include support, for example, for a display, touch screen, keyboard, button, click wheel, mouse, joystick, an image capturing device, microphone, speaker, biometric scanner, camera, card reader, barcode scanner, RFID reader, and/or other input/output mechanisms. In embodiments where circuitry 300 may be implemented as a server or database, aspects of input/output module 308 may be reduced as compared to embodiments where circuitry 300 may be implemented as an end-user machine or other type of device designed for complex user interactions. In some embodiments (like other components discussed herein), input/output module 308 may even be eliminated from circuitry 300. Alternatively, such as in embodiments wherein circuitry 300 is embodied as a server or database, at least some aspects of input/output module 308 may be embodied on an apparatus used by a user that is in communication with circuitry 300. Input/output module 308 may be in communication with memory 304, communications module 306, and/or any other component(s), such as via a bus. Although more than one input/output module and/or other component can be included in circuitry 300, only one is shown in FIG. 3 to avoid overcomplicating the disclosure (e.g., like the other components discussed herein).

In some embodiments, point-of-sale module 310 may also or instead be included and configured to perform the functionality discussed herein related providing point-of-sale functionality via linked consumer facing and merchant facing interfaces. In some embodiments, some or all of the functionality of point-of-sale module 310 may be performed by processor 302. In this regard, the example processes and algorithms discussed herein can be performed by at least one processor 302 and/or promotion module 310. For example, non-transitory computer readable storage media can be configured to store firmware, one or more application programs, and/or other software, which include instructions and other computer-readable program code portions that can be executed to control processors of the components of point-of-sale system 200 to implement various operations, including the examples shown above. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 302, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 304) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

LINKED MERCHANT AND CONSUMER INTERFACE

FIG. 4 shows an example of a method 400 for providing a linked consumer facing interface and merchant facing interface, in accordance with some embodiments. Method 400 may be performed by point-of-sale system 108 (e.g., merchant device 114 110), as shown in FIG. 1. Method 400 is described as being performed by merchant device 114 and/or consumer facing device 116, however, other suitable structures (e.g., server 110, a networked device, circuitry, etc.) may also be used in various embodiments.

Method 400 may begin at 402 and proceed to 404, where merchant device 114 and consumer facing device 116 may be configured to establish a communication connection. In some embodiments, the communication connection may be established via a direct wireless connection, such as wireless PAN 220 shown in FIG. 2. For example, where a Bluetooth communication protocol is used, merchant device 114 and consumer facing device 116 may be configured to pair and/or otherwise communicably bond to form a communication connection. In some embodiments, merchant device 114 and consumer facing device 116 may be configured to form a secure communication connection. For example, some or all of the data communicated between merchant device 114 and consumer facing device 116 (e.g., payment data, private consumer data, etc.) may be encrypted with a shared token, code, public key, etc. In some embodiments, merchant device 114 and consumer facing device 116 may be configured to alternatively or additionally establish a communication connection via network 104 (e.g., WiFi, mobile broadband, the Internet, via system 102, etc.). In some embodiments, merchant device 114 and consumer facing device 116 may be configured to alternatively or additionally establish a communication connection via wired connection (e.g., universal serial bus (USB), pin connectors, Ethernet, analog connectors (e.g., audio jack), etc.).

In some embodiments, such as where the processing steps of method 400 (and/or method 500) are performed by server 110, server 110 may be configured to establish communication connections with merchant device 114 and consumer facing device 116. For example, the communication connections may be established via network 104.

At 406, merchant device 114 may be configured to generate a merchant facing interface and a consumer facing interface. For example, the merchant facing device may include processing circuitry configured to execute computer readable program instructions from a non-transitory computer readable medium (e.g., a memory) that configures the processing circuitry to generate the merchant facing interface and the consumer facing interface. In some embodiments, the consumer facing interface may be generated by separate processing circuitry from the merchant facing interface, such as by consumer facing device 116. In some embodiments, such as where the processing steps of method 400 (and/or method 500) are performed by server 110, server 110 may be configured to establish a communication connection with merchant device 114 and consumer facing device 116. In some embodiments, server 110 may be configured to generate a merchant facing interface and a consumer facing interface.

At 408, merchant device 114 may be configured to provide the merchant facing interface to a merchant display device. For example and with reference to FIG. 2, merchant device 202 may include communications circuitry (e.g., a bus) configured to transfer display data associated with merchant facing interface 206 to merchant display device 216. In some embodiments, server 110 may be configured to provide the merchant facing interface to the merchant device, such as via network 104.

At 410, merchant device 114 may be configured to provide the consumer facing interface to a consumer facing display device. For example and with reference to FIG. 2, merchant device 202 may include communications circuitry configured to transfer display data associated with consumer facing interface 208 to consumer facing display device 218. Here, where consumer facing display device 218 is included in consumer facing device 204 and/or other second merchant device, merchant device 114 may be configured to send the display data via wireless PAN 220. In some embodiments, such as where wireless PAN 220 is not used and/or otherwise unavailable, merchant device 114 may be configured to communicate with consumer facing device 204 via network 104.

In some embodiments, such as where the consumer facing interface 208 generated by processing circuitry of consumer facing device 204, consumer facing interface 208 may include communications circuitry (e.g., a bus) configured to transfer display data associated with consumer facing interface 208 to consumer facing display device 218.

In some embodiments, such as where server 110 is configured to generate the consumer facing interface, server 110 may be further configured to provide the consumer facing interface to the consumer facing device, such as via network 104.

At 412, merchant device 114 may be configured to facilitate a financial transaction via the merchant facing interface and the consumer facing interface. For example, the merchant facing interface and consumer facing interface may be used in the course of commercial activity at a merchant shop. At a retail store, merchant device 114 and consumer facing device 116 may be located at a checkout line. At a dine-in restaurant, merchant device 114 and consumer facing device 116 may be located at a reservation desk, order counter, or the like. In some embodiments, merchant device 114 may be carried by a merchant to locations within a merchant shop (e.g., tables) where consumer facing devices 116 are disposed. In some embodiments, the merchant facing interface and a consumer facing interface may each include various linked interactive displays configured to facilitate a point-of-sale transaction, among other things. Additional details regarding financial transactions and/or other forms of consumer service that may be enhanced via linked merchant and consumer facing interfaces are discussed in method 500 and FIG. 5 and the example linked consumer merchant interfaces shown in FIGS. 6-12. In some embodiments, server 110 may be configured to facilitate the financial transaction. For example, server 110 may be configured to receive merchant inputs provided via the merchant facing interface and consumer inputs provided via the consumer facing interface. Server 110 may be further configured to facilitate the financial transaction based on one or more consumer inputs and/or merchant inputs. Method 400 may then proceed to 414 and end.

FIG. 5 shows an example of a method 500 for facilitating a financial transaction, in accordance with some embodiments. Method 500 may be performed by point-of-sale system 108 (e.g., merchant device 114 110), as shown in FIG. 1. Method 500 is described as being performed by merchant device 114 and/or consumer facing device 116, however, other suitable structures (e.g., server 110, a networked device, circuitry, etc.) may also be used in various embodiments. In some embodiments, method 500 may be performed with method 400, such as at 412.

Figure 6:
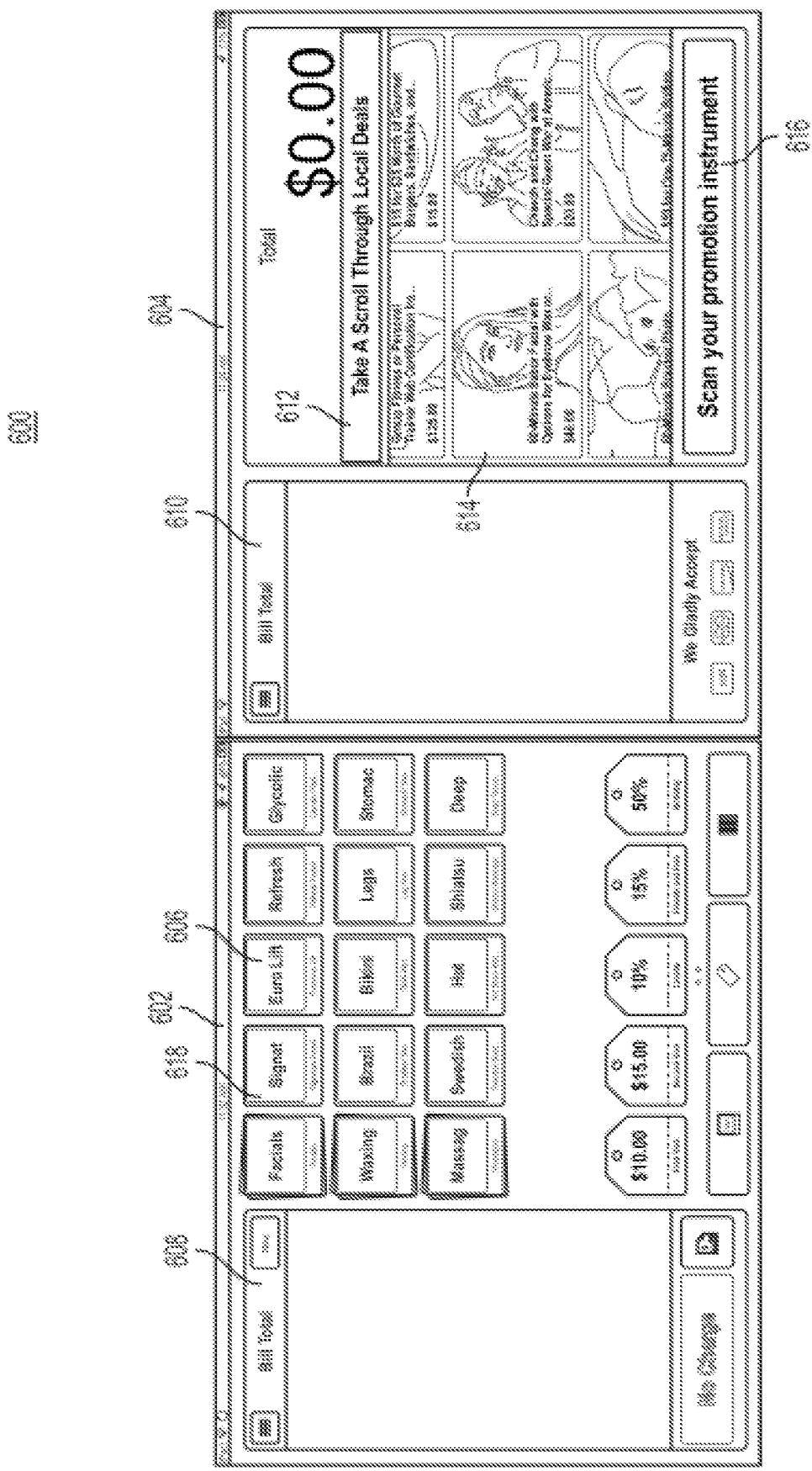

Method 500 may begin at 502 and proceed to 504, where merchant device 114 may be configured to receive merchant inputs provided via the merchant facing interface. FIGS. 6-14 show example linked merchant consumer interfaces 600, in accordance with some embodiments. With reference to FIG. 6, linked merchant consumer interface 600 may include merchant facing interface 602 and consumer facing interface 604. Merchant facing interface 602 may be an example interactive display that may be provided to a merchant facing display, such as merchant facing display 206 of merchant device 202. Consumer facing interface 604 may be an example interactive display that may be provided to a consumer facing display, such as consumer facing display device 218 of consumer facing device 204.

In some embodiments, merchant facing interface 602 may include item menu 606 and merchant point-of-sale order status indication 608. Consumer facing interface 604 may include consumer point-of-sale order status indication 610. In some embodiments, the merchant device may be configured to receive merchant inputs provided by the merchant via merchant facing interface 602. For example, the merchant may be allowed to select an item from item menu 606 (e.g., via a touchscreen and/or other merchant input device) to add to a point-of-sale order.

In some embodiments, server 110 may be configured to receive the merchant inputs provided via the merchant facing interface. For example, server 110 may communicate with the merchant device via network 104 to receive the merchant inputs provided via the merchant facing interface.

At 608, merchant device 114 may be configured to determine point-of-sale data based on at least one merchant input. For example, where the merchant input indicates a selected item, the merchant device may be configured to generate (e.g., based on the merchant input) point-sale-data that may indicate the item, an association between the item and the point-of-sale order, modifications to an item, etc. Other example merchant inputs that may be provided via merchant facing interface 602 may include point-of-sale data associated with removing an item from the point-of-sale order, setting a quantity count for the item, modifying an item, adding and/or removing extras and/or related items, creating a new point-of-sale order, accessing a pending point-of-sale order (e.g., the merchant device may be configured to facilitate consumer activity with multiple consumers in parallel), closing a point-of-sale order, among other things. In some embodiments, server 110 may be configured to receive the merchant inputs provided via the merchant facing interface. For example, server 110 may be configured to determine the point-of-sale data based on the at least one merchant input.

Figure 7:
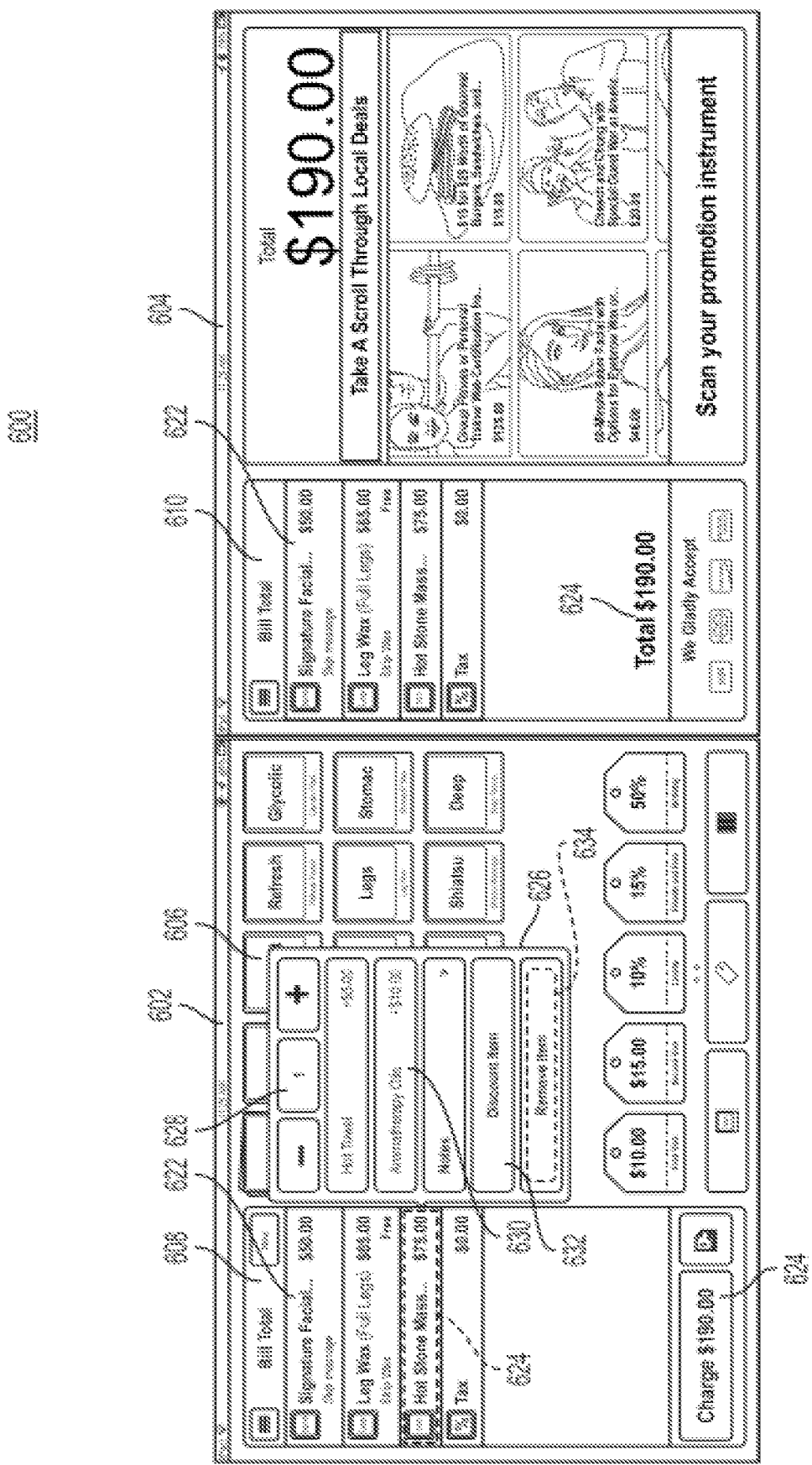

At 610, merchant device 114 (and/or server 110) may be configured to provide an indication of the point-of-sale data to the consumer facing interface of the consumer facing display device. Here, the consumer may view the point-of-sale data via the consumer facing interface, such as to ensure that the merchant has entered the point-of-sale data in accordance with the consumer's desires. For example, in response to the merchant selecting signature facial selection 618 from item menu 606 (e.g., via a touchscreen and/or other merchant input device) of merchant facing interface 602 (e.g., as shown in FIG. 6), signature facial item indication 622 may be added to the point-of-sale order as indicated in consumer point-of-sale order status indication 610 (e.g., as shown in FIG. 7) of consumer facing interface 610. In some embodiments, signature facial item indication 622 may additionally or alternatively be indicated in merchant point-of-sale order status indication 608 (e.g., as shown in FIG. 7) of merchant facing interface 602.

In some embodiments, the point-of-sale data may include a total transaction price. For example, as items are added to, modified, discounted, and/or removed from the point-of-sale order, merchant device 114 may be configured to determine the total transaction price and/or provide the total transaction price to the consumer facing interface and/or merchant facing interface (e.g., as shown in FIG. 7 for total transaction price 624 in merchant facing interface 602 and consumer facing interface 610).

In some embodiment, the point-of-sale data may include modifications to an item and/or related (e.g., side) items to the item. With reference to FIG. 7, for example, the merchant may be configured to provide merchant inputs for modifying the selected hot stone massage item, such as by selecting host stone massage indicator 624 in merchant point-of-sale order status indication 608. In response to the selection, the merchant device may be configured to provide item modification display 626. Via item modification display 626, the merchant may be configured to set a quantity count for the item at 628, add and/or remove one or more related items 630 (e.g., shown here as massage related items that can be used in connection with the hot stone massage item), add a discount to the item at 632 (or otherwise set or select an item price), and/or remove the item from the point-of-sale order at 634. In some embodiments, an indication of the point-of-sale data including modifications and/or related items may be provided to the consumer facing display and/or merchant facing display.

Returning to the method of FIG. 5, at 510, merchant device 114 (and/or server 110) may be configured to receive promotion redemption data indicating one or more promotions. For example, the promotion redemption data may be generated by the consumer via consumer facing interface 208 and using a promotion instrument reader (e.g., a camera 210, barcode scanner, etc.).

In some embodiments, point-of-sale system 108 (and/or promotion and marketing system 102) may be configured to provide for the purchase (or other acceptance) and redemption of promotions. For example, server 110 of system 102 may be configured to provide impressions of promotions associated with merchants to consumer devices 106 via network 104. In response to a consumer purchasing a promotion, server 110 may be further configured to provide an instrument that may be used (e.g., redeemed with point-of-sale system 108 of the merchant) toward at least a portion of the purchase of particular goods, services and/or experiences defined by the promotion to the consumer device.

In some embodiments, the instrument may be electronic and displayed on the consumer device at redemption. Here, the instrument may include promotion redemption data embodied in a barcode, token, identifier and/or other data configured to identify the promotion. Alternatively or additionally, the instrument may be printed in the form of a coupon or other non-electronic voucher. In some embodiments, the consumer facing interface and/or consumer facing device may be configured to provide for receiving promotion redemption data.

Figure 8:
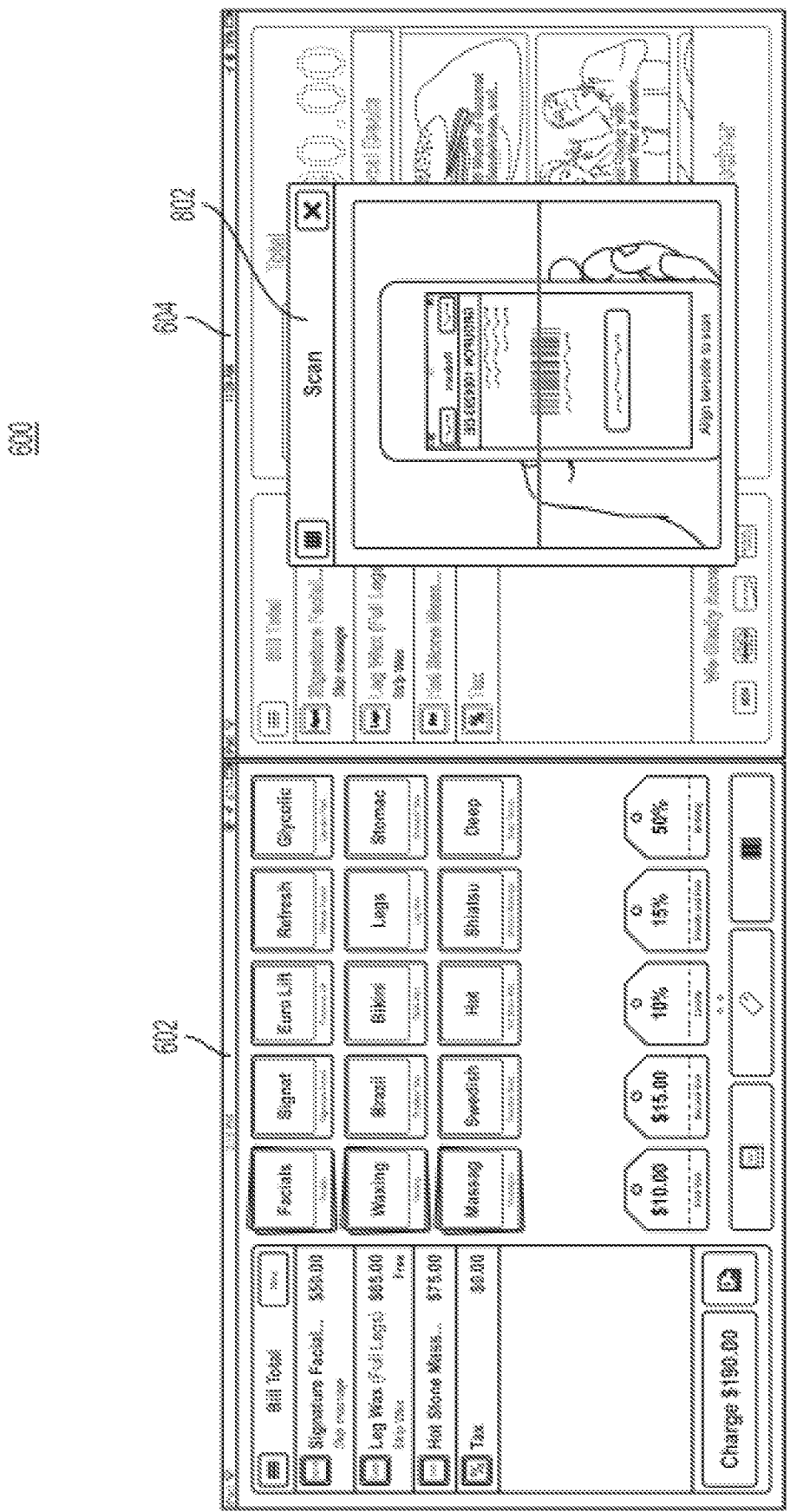

With reference to FIG. 6, for example, a consumer may provide the promotion redemption data upon selecting scan button 616 in consumer facing interface 604. In response to the consumer selecting scan button 616, consumer facing device 204 may be configured to activate the promotion instrument reader (e.g., camera 210). Furthermore, scan display 802 as shown in FIG. 8 may be provided to consumer facing interface 604. Here, the consumer may place the instrument (e.g., as shown in the display of consumer device 106 or a non-electronic coupon) to the input (e.g., camera lens or field of view) of the promotion instrument reader. In some embodiments, scan display 802 may include barcode scan line 804. Here, the consumer facing device may be configured to programmatically determine that the barcode has been placed on barcode scan line 804, receive inputs from the promotion instrument reader, and determine the promotion redemption data based on the barcode.

In some embodiments, the consumer facing device may be further configured to provide the promotion redemption data to the merchant device (e.g., via wireless PAN 220 and/or network 104). In some embodiments, such as where the promotion redemption data is associated with an identifier or other non-barcode data, the promotion redemption data may be provided to the merchant device via a touch-screen. Here, for example, the promotion redemption data may be entered by the merchant via the merchant facing interface and/or by the consumer via the consumer facing interface. Alternatively or additionally, optical character recognition (OCR) or other machine reading techniques may be used to determine the promotion redemption data from an instrument.

In some embodiments, in response to receiving the promotion redemption data, merchant device 114 may be configured to determine one or more promotions associated with the promotion redemption data and associated promotion data of the one or more promotions. For example, merchant device 114 may be configured to send the promotion redemption data to server 110 and receive the associated promotion data. The associated promotion data may indicate, for example, the underlying item of the promotion and/or a discount value (e.g., from a regular, non-promotional price) associated with the purchase of the underlying item via the promotion.

Figure 9:
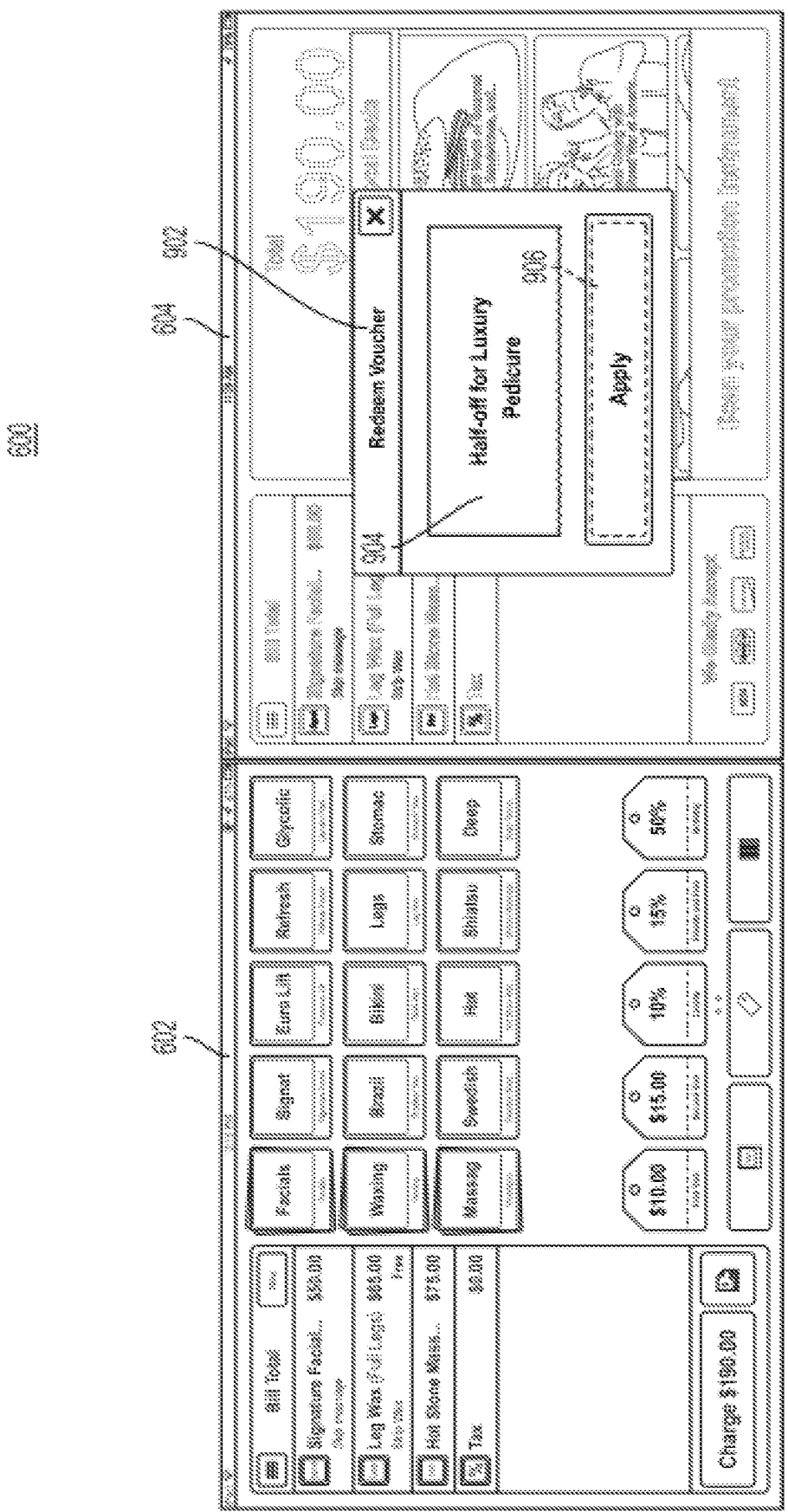

In some embodiments, the promotion data may be provided to the consumer facing interface for consumer confirmation and/or acceptance of redemption. With reference to FIG. 9, for example, in response to the consumer providing the promotion redemption data (e.g., via scan display 802), promotion redemption confirmation display 902 may be provided to the consumer facing interface. Promotion redemption confirmation display 902 may include an indication of promotion data 904, showing the name and/or description of the promotion. Promotion redemption confirmation display 902 may further include apply button 906, which may be selected by the consumer to add the promotion redemption (e.g., the discounted item) to the point-of-sale order.

Figure 10:
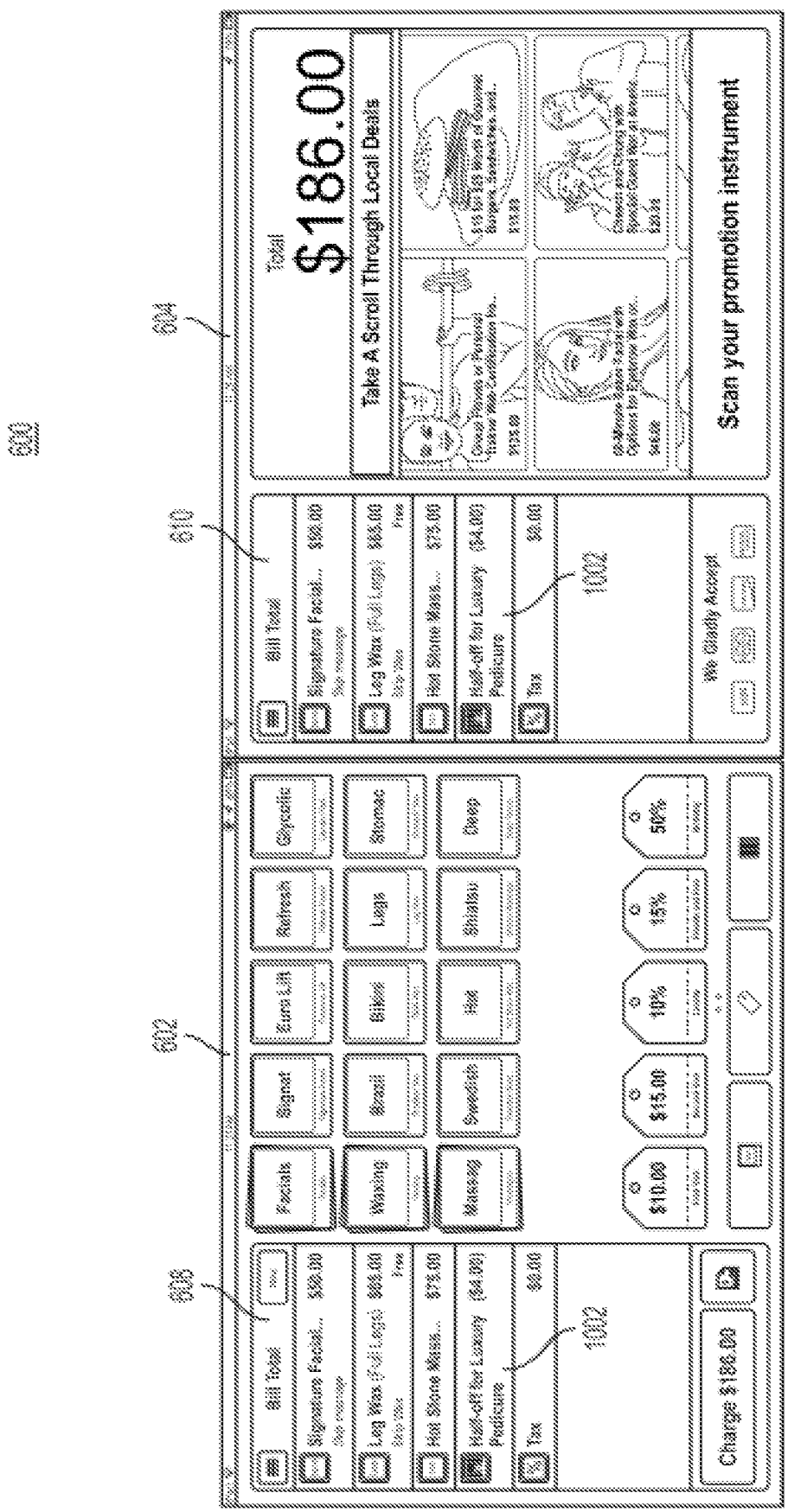

With reference to FIG. 10, in response to the consumer selecting apply button 906, the promotion may be added to the point-of-sale order. For example, promotion indication 1002 (here, half off for a luxury pedicure) may be provided to consumer point-of-sale order status indication 610 of consumer facing interface 604 and/or merchant point-of-sale order status indication 608 of merchant facing interface 602. In some embodiments, promotion indication 1002 may be treated similar to other items. For example, modifications and/or related items may be added. In some embodiments, the promotion may also be removed from the point-of-sale order, such as in a manner similar to the description herein regarding removal of an (e.g., non-promotional) item from the point-of-sale order.

In some embodiments, the consumer facing interface may be configured to provide impressions indicating one or more promotions to consumers for purchase and/or acceptance. With reference to FIG. 6, for example, consumer facing interface 604 may include impression 612 indicating one or more promotions such as promotion 614. In some embodiments, the merchant device and/or consumer facing device may be configured to communicate with server 110 to receive promotion data for providing impression 612.

In some embodiments, the one or more promotions of impression 612 may be selected for display on consumer facing interface 604 based on one or more relevance factors. For example, the one or more promotions of impression 612 may be selected for display on consumer facing interface 604 based on the location of the merchant device such that the one or more promotions are deals that are local (e.g., within 1, 5, 10, 20 miles, etc.) to a consumer at the merchant shop. In some embodiments, the one or more promotions of impression 612 may be additionally or alternatively selected for display on consumer facing interface 604 based on the merchant or promotion category. For example, only promotions associated with the merchant of the POS system may be provided to consumer facing interface 604. In another example, only promotions associated with other merchants that are not competitors of the merchant of the POS system may be provided to consumer facing interface 604.

In some embodiments, the one or more promotions of impression 612 may be additionally or alternatively selected for display on consumer facing interface 604 based on consumer data indicating consumer preferences, purchase histories, ratings, etc. For example, the consumer information may be associated with a consumer account provided by server 110. In some embodiments, merchant device 114 may be configured to programmatically identify a consumer and/or consumer account based on receiving wallet identifying data from a consumer device. For example, merchant device 114 may be configured to receive the wallet identifying data from the consumer device and may send the wallet identifying data to server 110. In response, merchant device 114 may be further configured to receive consumer data and/or the promotion data determined based on the consumer data from server 110. Additional discussion regarding consumer device based consumer presence detection and identification, applicable to some embodiments, can be found in U.S. patent application Ser. No. 13/801,610, titled "Consumer Presence Based Deal Offers," filed Mar. 13, 2013, which is incorporated by reference in its entirety herein.

At 512, merchant device 114 (and/or server 110) may be configured to receive tip data. For example, the tip data may be provided by consumer input via consumer facing interface 604 and may be sent to merchant device 114 from consumer facing device 116 via wireless PAN 220 and/or network 104. The tip data may indicate a tip amount to be added to a preliminary total transaction cost (e.g. not including the tip amount) of the point-of-sale order.

Figure 11:
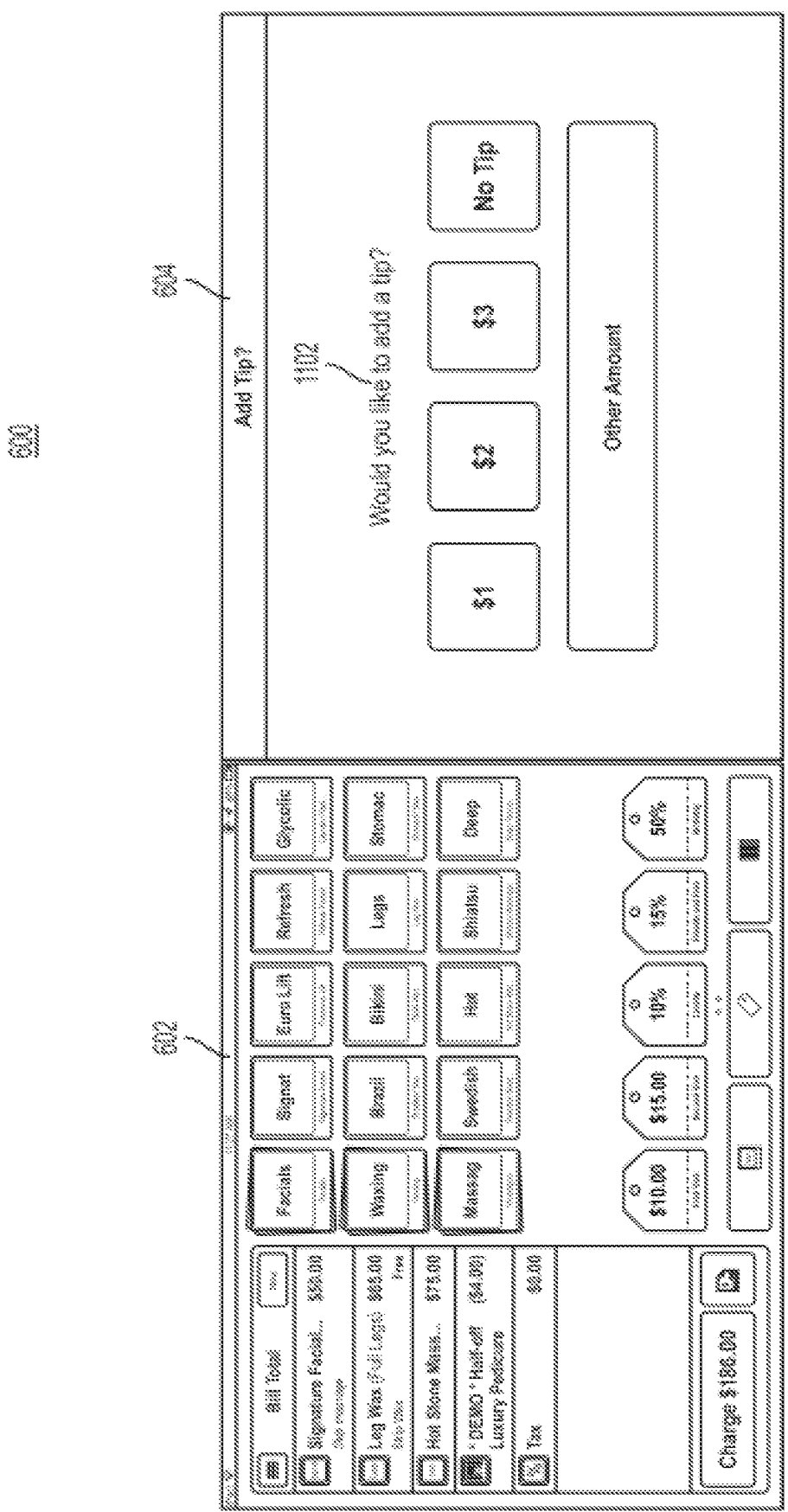

In some embodiments, the consumer facing interface may include or otherwise provide for interfaces configured to receive consumer input of the tip amount. With reference to FIG. 11, for example, consumer facing interface 604 may be configured to provide tip display 1102. Via tip display 1102, the consumer may be allowed to select (e.g., via a touchscreen or other consumer input device) a predetermined tip amount (e.g., as a real currency value and/or as a percentage of some or all of the preliminary total transaction cost) and/or a custom tip amount.

At 514, merchant device 114 (and/or server 110) may be configured to determine a total transaction cost. The total transaction cost may be determined based on one or more of the point-of-sale data (e.g. indicating items added to the point-of-sale order and/or associated prices), the promotion redemption data (e.g., indicating a discount value to be deducted from a preliminary total transaction cost that does not include the discount value), the tip data (e.g., indicating a tip amount to be added to a preliminary total transaction cost that does not include the tip amount), and/or a tax amount.

In some embodiments, the total transaction cost and/or the various portions thereof may be provided to the consumer facing interface and/or merchant facing interface. For example, the total transaction cost including the tip amount may be provided to consumer facing interface 604 and/or merchant facing interface 602, such as shown in total transaction cost indication 1204 for consumer facing interface 604 in FIG. 12.

At 516, merchant device 114 (and/or server 110) may be configured to receive payment data of the consumer. For example, the consumer facing interface and/or consumer facing device may be configured to receive the payment data, such as from a card reader (e.g., card reader 212 of consumer facing device 204 shown in FIG. 2) configured to generate the payment data. Here, the payment data may include credit card data (e.g., credit card number, expiration date, card verification value (CVV) etc.), debit card data, among other things that may be used to facilitate a financial transaction for the point-of-sale order. In some embodiments, the payment data may be provided by the consumer using consumer facing device 204 and send to merchant device 202, such as via wireless PAN 220 and/or network 104. In some embodiments, the payment data may be stored in association with a consumer account, such as in database 112 of system 102. Here, merchant device 114 may be configured to communicate with server 110 to receive the payment data. In another example, the payment data may be stored at system 102. Here, merchant device 114 may be configured to provide suitable point-of-sale data to system 102 to facilitate the financial transaction based on the stored payment data. Additional discussion regarding consumer account payments, applicable to some embodiments, can be found in U.S. patent application Ser. No. 13/801,610, incorporated by reference above.

Figure 12:
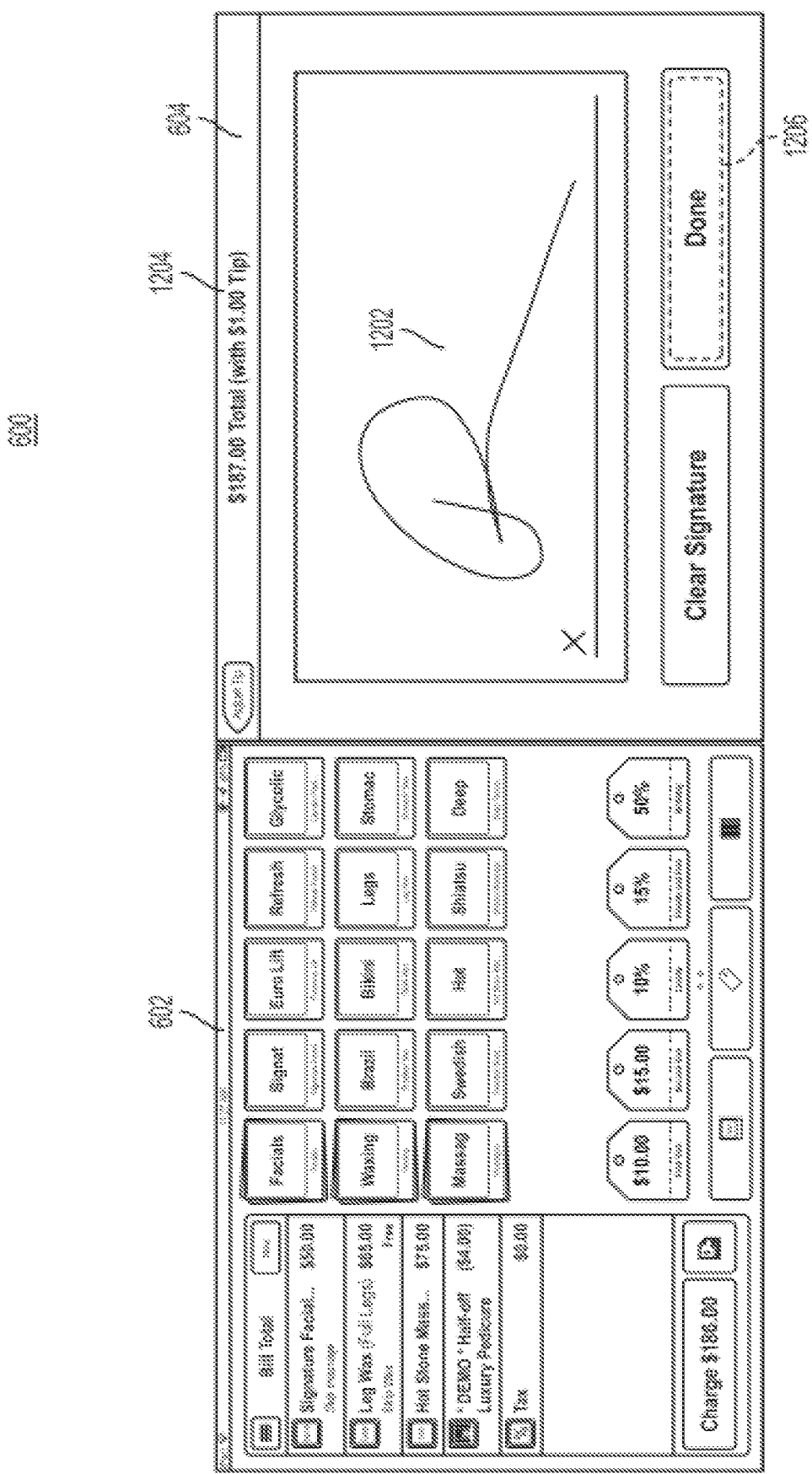

In some embodiments, the payment data may include consumer signature data and/or other payment confirmation data. With reference to FIG. 12, for example, consumer facing interface 604 may include payment confirmation display 1202 configured to receive the payment data in the form of consumer signature data. Here, the consumer may provide consumer inputs indicating the consumer signature data, such as via a touchscreen, touchpad, etc. Payment confirmation display 1202 may further include total transaction cost indication 1204. The consumer may indicate that the total transaction cost and/or consumer signature data is complete and/or accurate by selecting signature complete button 1206. In response, the consumer signature data and/or other payment data may be sent from the consumer facing device to merchant device 114.

At 518, merchant device 114 (and/or server 110) may be configured to facilitate a financial transaction based on the total transaction cost and the payment data. For example, merchant device 114 may be configured to send the total transaction cost and the payment data to system 102 and/or other payment server. Merchant device 114 may be further configured to receive payment confirmation data from system 102 and/or other payment server indicating that the financial transaction was successfully completed or that the financial transaction was unsuccessful (e.g., as may be caused invalid payment data).

In some embodiments, such as where consumer devices are used to provide payment, the payment data may be indicated and/or otherwise secured using an electronic signature and/or other encrypted data generated using a wallet identifying token provided by system 102 and/or other payment server. For example, merchant device 114 may be configured to provide the point-of-sale data to consumer device 106 indicating the total transaction price or some portion thereof. The consumer device may be configured to generate secured payment data (e.g., such by signing the point-of-sale data or other payment data with a wallet identifying token securely shared with system 102 and/or other payment server) for the total transaction cost and to provide the secured payment approval data to merchant device 114. Merchant device 114 may then be configured to send the secured payment data and point-of-sale data (e.g., including the total transaction cost) to server 110 (e.g., of system 102) and/or other payment server to facilitate the financial transaction. Server 110 may be configured to generate secured payment data by signing the point-of-sale data with a stored copy of the wallet identifying token and comparing the generated secured payment data against the one received from the merchant device. Upon successful authentication of the received data, server 110 may be configured to send the point-of-sale data with payment data of the consumer (e.g., associated via the consumer account) to a financial server, such as a server associated with the Automated Clearing House (ACH) for United States transactions. Additional discussion regarding secured consumer device payments, applicable to some embodiments, may be found in U.S. patent application Ser. No. 13/764,753, titled "Consumer Device Token Management," filed Feb. 11, 2013, and U.S. patent application Ser. No. 13/801,520, titled "Peer-to-Peer Payment Processing," filed Mar. 13, 2013, which are each incorporated by reference in their entirety herein, and U.S. patent application Ser. No. 13/801,610, incorporated by reference above. In some embodiments, the wallet identifying token may be based at least partially a media access control (MAC) address of the consumer device.

In some embodiments, the consumer device (e.g., where consumer devices are used to provide payment) and/or consumer facing device may be configured to send the payment data to system 102 and/or other payment server, such as without the merchant device acting as an intermediary. In some embodiments, some or all of the functionalities of the merchant facing interface may be provided to the consumer facing interface. For example, the consumer facing interface may include a display of menu items for generating point-of-sale data by consumer inputs. Additionally or alternatively, some or all of the functionalities of the consumer facing interface may be provided to the merchant facing interface.

At 520, merchant device 114 (and/or server 110) may be configured to provide a payment confirmation. In some embodiments, the payment confirmation may include a receipt or other summary of the point-of-sale order. For example, the receipt may include receipt data indicating items associated with the point-of-sale order, item prices, tip amounts, promotion discounts, tax amounts, a total transaction cost, a transaction date, the payment account/method used, etc. In some embodiments, the receipt may be provided to the consumer device (e.g., via email) and/or as a printed receipt.

Figure 13:
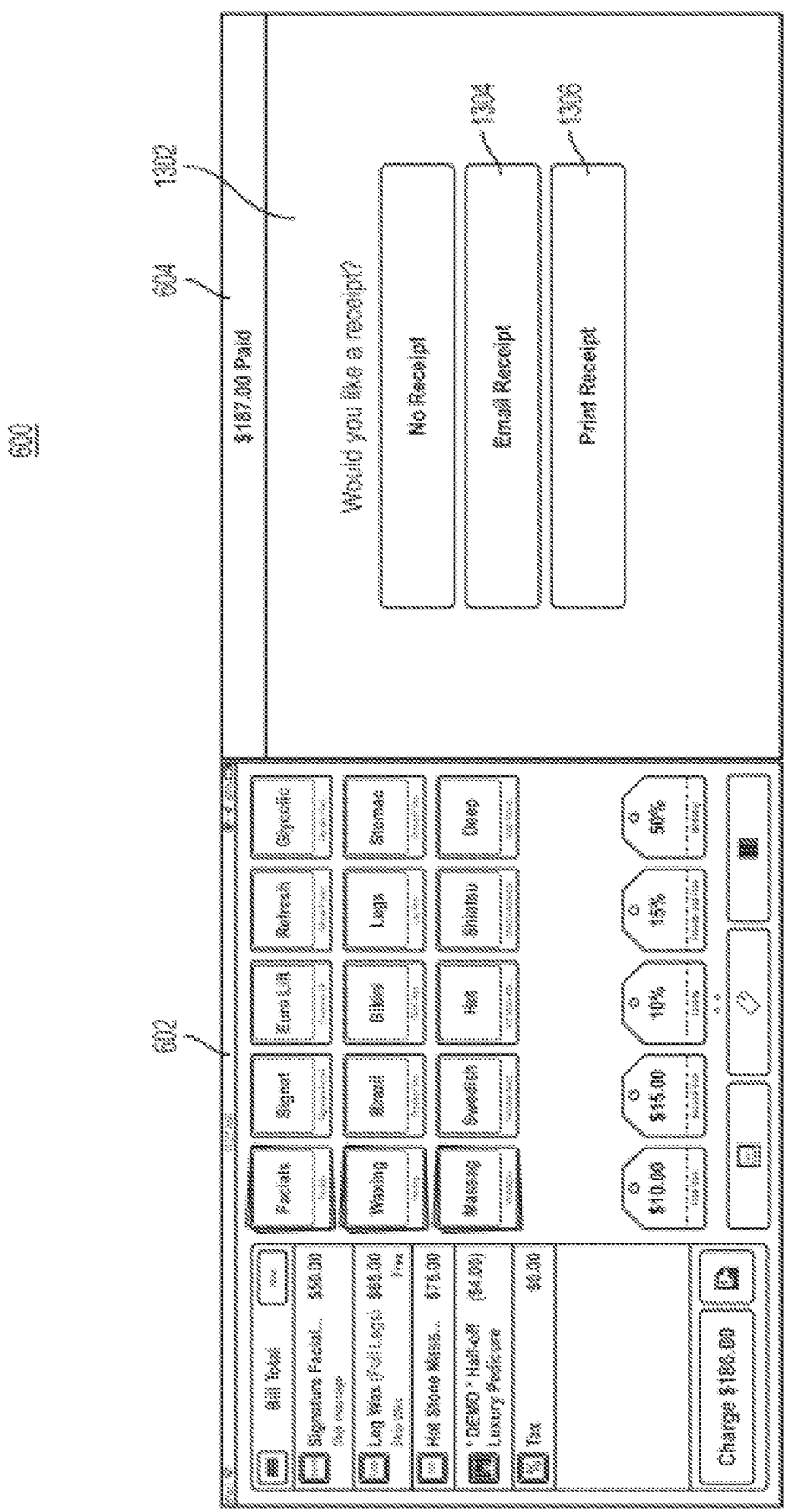

With reference to FIG. 13, for example, consumer facing interface 604 may include receipt selection display 1302. Here, the consumer may be allowed to provide receipt selection data indicating whether and/or how a receipt is to be provided to the consumer. The consumer may specify that a receipt is not needed via selection of no receipt button 1304, that an email receipt is desired via selection of email receipt button 1306, and/or that a printed receipt is desired via print receipt button 1308. Merchant device 114 and/or consumer facing device 116 may be configured to facilitate at least one of printing and emailing of a receipt for the financial transaction based on the consumer input. In response to the consumer selecting email receipt button 1304, merchant device 114 and/or consumer facing device 116 may be configured to send an email including the receipt data. For example, the email may be provided by the consumer via consumer facing interface 604. In another example, merchant device 114 may be configured to communicate with system 102 to send the receipt data via an email account and/or some other communication channel associated with the consumer and/or consumer account. In response to the consumer selecting print receipt button 1306, merchant device 114 and/or consumer facing device 116 may be configured to send the receipt data to a receipt printer or the like. As such, in some embodiments, the point-of-sale system may further include a receipt printer which may communicably connected with merchant device 114 and/or consumer facing device 116 (e.g., via a wireless PAN, a wired connection, and/or network 104).

Figure 14:
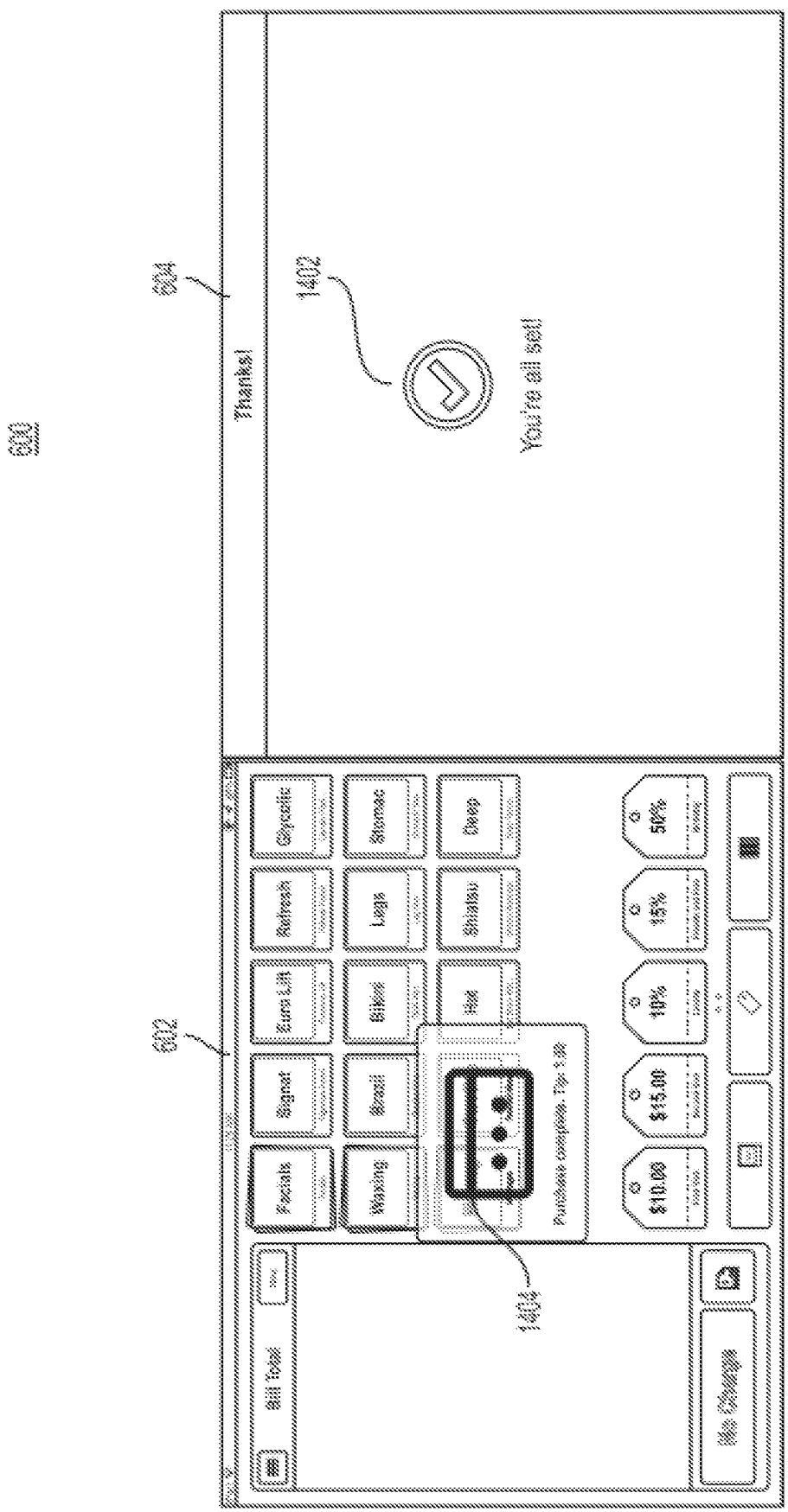

In some embodiments, the payment confirmation may additionally or alternatively include a payment status confirmation. The payment status confirmation may indicate that the financial transaction was processed successfully or unsuccessfully. With reference to FIG. 14, for example, consumer facing interface 604 may be configured to provide payment status confirmation 1402 configured to indicate that the financial transaction was successful to the consumer. Additionally or alternatively, merchant facing interface 602 may include payment status confirmation 1404 configured to indicate that the financial transaction was successful to the merchant. Method 500 may then proceed to 522 and end.

CONCLUSION

Many modifications and other embodiments will come to mind to one skilled in the art to which these embodiments pertain having the benefit of the teachings presented in the foregoing descriptions and the associated drawings. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A promotion and marketing system for promoting and facilitating transactions, the promotion and marketing system comprising a promotion and marketing system server comprising a processor and executable code stored in a non-volatile memory, such that when the executable code is executed the processor is configured to:
   receive promotion transaction data, wherein the promotion transaction data indicates a purchased promotion for at least one good or service associated with a consumer profile;
   generate an instrument based on the promotion transaction data, wherein the instrument is redeemable for the purchased promotion;
   provide the instrument to a consumer device associated with the consumer profile;
   establish a first wireless connection with a merchant facing device and a consumer facing device, wherein data transferred between the merchant facing device, the consumer facing device, and the promotion and marketing system server is encrypted, and wherein the merchant facing device, the consumer facing device, and the consumer device are distinct devices;

receive, from the merchant facing device, wallet identifying data associated with the consumer profile;

generate a consumer facing interface for rendering on a consumer facing device display of the consumer facing device, wherein the consumer facing interface comprises an additional impressions interface component and an interactive scan button;

transmit the consumer facing interface to the consumer facing device over the first wireless connection for rendering on the consumer facing device display;

generate a merchant facing interface for rendering on a merchant facing device display of the merchant facing device;

transmit the merchant facing interface to the merchant facing device over the first wireless connection for rendering on the merchant facing device display;

in response to a consumer engagement of the interactive scan button on the consumer facing interface, update the consumer facing interface to include a scan prompt interface, wherein the scan prompt interface is configured to trigger capture of redemption data associated with the instrument as it is displayed on a redemption interface of the consumer device;

receive the redemption data associated with the instrument from the consumer facing device;

parse the redemption data associated with the instrument;

generate a promotion redemption confirmation display for rendering on the consumer facing device display, wherein the promotion redemption confirmation display is generated at least partially based on the redemption data associated with the instrument;

transmit the promotion redemption confirmation display to the consumer facing device;

receive a confirmation indication of the redemption data associated with the instrument from the consumer facing device in response to consumer engagement of the promotion redemption confirmation display of the consumer facing interface;

generate a relevant additional impressions set based on the promotion transaction data and consumer data, wherein the consumer data is associated with the consumer profile, and wherein the relevant additional impressions set indicates additional promotions that are targeted at a consumer associated with the consumer profile;

transmit the relevant additional impressions set to the consumer facing device for rendering on the additional impressions interface component of the consumer facing interface;

determine a total transaction value based at least in part on the redemption data associated with the instrument;

generate a total transaction interface comprising the total transaction value for rendering on the consumer facing interface of the consumer facing device display and the merchant facing interface of the merchant facing device display;

transmit the total transaction interface to the consumer facing device and the merchant facing device;

establish a second wireless connection with a payment server system;

facilitate a financial transaction in conjunction with the payment server system based on the total transaction value and payment data received based on the consumer interacting with the consumer facing device;

receive payment confirmation data from the payment server system; and transmit the payment confirmation data to the merchant facing device and the consumer facing device.

2. The promotion and marketing system of claim 1, wherein to parse the redemption data associated with the instrument further comprises employing optical character recognition (OCR) on at least a portion of the redemption data.

3. The promotion and marketing system of claim 1, wherein at least a portion of the redemption data associated with the instrument comprises barcode data, and wherein to parse the redemption data associated with the instrument further comprises decoding the barcode data comprised within the redemption data.

4. The promotion and marketing system of claim 1, wherein the relevant additional impressions set is generated based at least in part on a location of a merchant associated with the merchant facing device.

5. The promotion and marketing system of claim 1, wherein the consumer data comprises consumer preferences, purchase histories, consumer-provided ratings, and digital wallet data.

6. The promotion and marketing system of claim 5, wherein the wallet identifying data received from the merchant facing device is associated with the digital wallet data associated with the consumer profile, and wherein the digital wallet data comprises payment data associated with at least one of credit card data, debit card data, bank account data, and signature data associated with the consumer associated with the consumer profile.

7. The promotion and marketing system of claim 6, wherein to facilitate the financial transaction further comprises transmitting payment data associated with the consumer profile to the merchant facing device.

8. The promotion and marketing system of claim 6, wherein the promotion and marketing system server is configured to generate secured payment data, wherein the secured payment data is generated based on an authentication between the wallet identifying data received by the merchant facing device and the digital wallet data associated with the consumer profile, and wherein the secured payment data can be used to facilitate the financial transaction.

9. A computer-implemented method for promoting and facilitating transactions via a promotion and marketing system, the computer-implemented method comprising:

receiving, by a promotion and marketing system server, promotion transaction data, wherein the promotion transaction data indicates a purchased promotion for at least one good or service associated with a consumer profile;

generating an instrument based on the promotion transaction data, wherein the instrument is redeemable for the purchased promotion;

providing the instrument to a consumer device associated with the consumer profile;

establishing a first wireless connection with a merchant facing device and a consumer facing device, wherein data transferred between the merchant facing device, the consumer facing device, and the promotion and marketing system server is encrypted, and wherein the merchant facing device, the consumer facing device, and the consumer device are distinct devices;

receiving, from the merchant facing device, wallet identifying data associated with the consumer profile;

generating a consumer facing interface for rendering on a consumer facing device display of the consumer facing device, wherein the consumer facing interface comprises an additional impressions interface component and an interactive scan button;

transmitting the consumer facing interface to the consumer facing device over the first wireless connection for rendering on the consumer facing device display;

generating a merchant facing interface for rendering on a merchant facing device display of the merchant facing device;

transmitting the merchant facing interface to the merchant facing device over the first wireless connection for rendering on the merchant facing device display;

in response to a consumer engagement of the interactive scan button on the consumer facing interface, updating the consumer facing interface to include a scan prompt interface, wherein the scan prompt interface is configured to trigger capture of redemption data associated with the instrument as it is displayed on a redemption interface of the consumer device;

receiving the redemption data associated with the instrument from the consumer facing device;

parsing the redemption data associated with the instrument;

generating a promotion redemption confirmation display for rendering on the consumer facing device display, wherein the promotion redemption confirmation display is generated at least partially based on the redemption data associated with the instrument;

transmitting the promotion redemption confirmation display to the consumer facing device;

receiving a confirmation indication of the redemption data associated with the instrument from the consumer facing device in response to consumer engagement of the promotion redemption confirmation display of the consumer facing interface;

generating a relevant additional impressions set based on the promotion transaction data and consumer data, wherein the consumer data is associated with the consumer profile, and wherein the relevant additional impressions set indicates additional promotions that are targeted at a consumer associated with the consumer profile;

transmitting the relevant additional impressions set to the consumer facing device for rendering on the additional impressions interface component of the consumer facing interface;

determining a total transaction value based at least in part on the redemption data associated with the instrument;

generating a total transaction interface comprising the total transaction value for rendering on the consumer facing interface of the consumer facing device display and the merchant facing interface of the merchant facing device display;

transmitting the total transaction interface to the consumer facing device and the merchant facing device;

establishing a second wireless connection with a payment server system;

facilitating a financial transaction in conjunction with the payment server system based on the total transaction value and payment data received by the consumer interacting with the consumer facing device;

receiving payment confirmation data from the payment server system; and transmitting the payment confirmation data to the merchant facing device and the consumer facing device.

10. The computer-implemented method of claim 9, wherein parsing the redemption data associated with the instrument further comprises employing optical character recognition (OCR) on at least a portion of the redemption data.

11. The computer-implemented method of claim 9, wherein at least a portion of the redemption data associated with the instrument comprises barcode data, and wherein parsing the redemption data associated with the instrument further comprises decoding the barcode data comprised within the redemption data.

12. The computer-implemented method of claim 9, wherein the relevant additional impressions set is generated based at least in part on a location of a merchant associated with the merchant facing device.

13. The computer-implemented method of claim 9, wherein the consumer data comprises consumer preferences, purchase histories, consumer-provided ratings, and digital wallet data.

14. The computer-implemented method of claim 13, wherein the wallet identifying data received from the merchant facing device is associated with the digital wallet data associated with the consumer profile, and wherein the digital wallet data comprises payment data associated with at least one of credit card data, debit card data, bank account data, and signature data associated with the consumer associated with the consumer profile.

15. The computer-implemented method of claim 14, wherein facilitating the financial transaction further comprises transmitting payment data associated with the consumer profile to the merchant facing device.

16. The computer-implemented method of claim 14, wherein the promotion and marketing system server is configured to generate secured payment data, wherein the secured payment data is generated based on an authentication between the wallet identifying data received by the merchant facing device and the digital wallet data associated with the consumer profile, and wherein the secured payment data can be used to facilitate the financial transaction.

17. A computer program product for promoting and facilitating transactions via a promotion and marketing system, the computer program product comprising at least one non-transitory computer-readable storage medium having computer-executable program code instructions stored therein, the computer-executable program code instructions comprising program code instructions to:

receive, by a promotion and marketing system server, promotion transaction data, wherein the promotion transaction data indicates a purchased promotion for at least one good or service associated with a consumer profile;

generate an instrument based on the promotion transaction data, wherein the instrument is redeemable for the purchased promotion;

provide the instrument to a consumer device associated with the consumer profile;

establish a first wireless connection with a merchant facing device and a consumer facing device, wherein data transferred between the merchant facing device, the consumer facing device, and the promotion and marketing system server is encrypted, and wherein the merchant facing device, the consumer facing device, and the consumer device are distinct devices;

receive, from the merchant facing device, wallet identifying data associated with the consumer profile;

generate a consumer facing interface for rendering on a consumer facing device display of the consumer facing device, wherein the consumer facing interface comprises an additional impressions interface component and an interactive scan button;

transmit the consumer facing interface to the consumer facing device over the first wireless connection for rendering on the consumer facing device display;

generate a merchant facing interface for rendering on a merchant facing device display of the merchant facing device;

transmit the merchant facing interface to the merchant facing device over the first wireless connection for rendering on the merchant facing device display;

in response to a consumer engagement of the interactive scan button on the consumer facing interface, update the consumer facing interface to include a scan prompt interface, wherein the scan prompt interface is configured to trigger capture of redemption data associated with the instrument as it is displayed on a redemption interface of the consumer device;

receive the redemption data associated with the instrument from the consumer facing device;

parse the redemption data associated with the instrument;

generate a promotion redemption confirmation display for rendering on the consumer facing device display, wherein the promotion redemption confirmation display is generated at least partially based on the redemption data associated with the instrument;

transmit the promotion redemption confirmation display to the consumer facing device;

receive a confirmation indication of the redemption data associated with the instrument from the consumer facing device in response to consumer engagement of the promotion redemption confirmation display of the consumer facing interface;

generate a relevant additional impressions set based on the promotion transaction data and consumer data, wherein the consumer data is associated with the consumer profile, and wherein the relevant additional impressions set indicates additional promotions that are targeted at a consumer associated with the consumer profile;

transmit the relevant additional impressions set to the consumer facing device for rendering on the additional impressions interface component of the consumer facing interface;

determine a total transaction value based at least in part on the redemption data associated with the instrument;

generate a total transaction interface comprising the total transaction value for rendering on the consumer facing interface of the consumer facing device display and the merchant facing interface of the merchant facing device display;

transmit the total transaction interface to the consumer facing device and the merchant facing device;

establish a second wireless connection with a payment server system;

facilitate a financial transaction in conjunction with the payment server system based on the total transaction value and payment data received by the consumer interacting with the consumer facing device;

receive payment confirmation data from the payment server system; and transmit the payment confirmation data to the merchant facing device and the consumer facing device.

18. The computer program product of claim 17, wherein to parse the redemption data associated with the instrument further comprises employing optical character recognition (OCR) on at least a portion of the redemption data.

19. The computer program product of claim 17, wherein at least a portion of the redemption data associated with the instrument comprises barcode data, and wherein to parse the redemption data associated with the instrument further comprises decoding the barcode data comprised within the redemption data.

20. The computer program product of claim 17, wherein the relevant additional impressions set is generated based at least in part on a location of a merchant associated with the merchant facing device.

* * * * *